(12) United States Patent
Pal et al.

(10) Patent No.: US 7,048,334 B2
(45) Date of Patent: May 23, 2006

(54) VEHICLE HEADREST APPARATUS

(75) Inventors: Chinmoy Pal, Yokosuka (JP); Izumi Kobayashi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/790,227

(22) Filed: Mar. 2, 2004

(65) Prior Publication Data
US 2004/0195894 A1 Oct. 7, 2004

(30) Foreign Application Priority Data
Apr. 7, 2003 (JP) .............................. 2003-103065

(51) Int. Cl.
B60N 2/427 (2006.01)
B60N 2/48 (2006.01)
B60R 21/00 (2006.01)
B60R 21/55 (2006.01)

(52) U.S. Cl. ................. 297/216.12; 297/391; 297/408; 297/410

(58) Field of Classification Search ........... 297/216.12, 297/391, 408, 410, 216.1, 406, 407; 280/751
See application file for complete search history.

(56) References Cited

U.S. PATENT DOCUMENTS

| | | | |
|---|---|---|---|
| 2,828,810 A * | 4/1958 | Barecki et al. ............. | 297/396 |
| 3,645,556 A * | 2/1972 | Kobori ....................... | 280/749 |
| 4,856,848 A * | 8/1989 | O'Sullivan et al. ......... | 297/391 |
| 6,270,161 B1 * | 8/2001 | De Filippo .................. | 297/410 |
| 6,474,733 B1 * | 11/2002 | Heilig et al. ............. | 297/216.12 |
| 6,550,856 B1 * | 4/2003 | Ganser et al. ................. | 297/61 |
| 6,761,403 B1 * | 7/2004 | Pal et al. ............... | 297/216.12 |
| 6,863,343 B1 * | 3/2005 | Pal et al. ............... | 297/216.12 |
| 2001/0040396 A1 * | 11/2001 | Kreuels et al. ........ | 297/216.12 |
| 2003/0030309 A1 | 2/2003 | Pal et al. | |
| 2003/0122409 A1 | 7/2003 | Pal et al. | |
| 2004/0000807 A1 | 1/2004 | Pal et al. | |

FOREIGN PATENT DOCUMENTS

| | | |
|---|---|---|
| JP | 06-059163 U | 8/1994 |
| JP | 07-291005 A | 11/1995 |

* cited by examiner

Primary Examiner—Rodney B. White
Assistant Examiner—Stephen Vu
(74) Attorney, Agent, or Firm—Shiniyu Global IP Counselors

(57) ABSTRACT

A vehicle headrest apparatus has a headrest unit mounted to an upper end of a seatback. The headrest unit has a headrest members with a head restraining member configured to be tensioned to restrain a passenger's head upon a rear-end collision. The headrest unit quickly and reliably restrains a seated passenger's head during a rear-end collision without utilizing the inertia force of the passenger's body by detecting the rear-end collision and pushing the headrest unit only outward in the forward direction of the vehicle. The headrest unit also has a swing/pushup device that to pushes the headrest members upwardly and forwardly. An auxiliary swing force adding device applies an auxiliary spring force in the deployment direction of the headrest members to increase the deployment speed of the headrest members and shorten the amount of time required to achieve initial contact between the passenger's head H and the head restraining member.

20 Claims, 19 Drawing Sheets

VEHICLE HEADREST APPARATUS

BACKGROUND OF THE INVENTION

1. Field of the Invention

The present invention generally relates to a vehicle headrest apparatus that is used on a vehicle seat and supports the head of a seated passenger. More specifically, the present invention relates to a vehicle headrest apparatus that is configured to reliably restrain a passenger's head and suppress the rearward movement of a passenger's head when a rear-end collision occurs by actuating a headrest unit itself.

2. Background Information

Many conventional automobile seatbacks are designed to protect the head of a seated passenger in the event of a rear-end collision. In one example of such an arrangement, the seatback bears the dynamic load that acts on a seated passenger due to inertia when the vehicle is subjected to a rear-end collision. The movement of a member in the seatback that is displaced as a result of the dynamic load is transmitted to a headrest support arm and the headrest unit moves toward the front of the vehicle. As a result, a large rearward movement of the seated passenger's head can be prevented. An example of this type of an arrangement is disclosed in Japanese Laid-Open Patent Publication No. 7-291005 (page 3, FIG. 6).

In another example, when a rear-end collision occurs, a sensor built into the seatback is depressed strongly by the inertia force of the seated passenger and an airbag is deployed from inside the headrest unit. As a result, even if space exists between the neck area of the seated passenger and the headrest unit, the passenger's head can be prevented from moving rearward. An example of this type of an arrangement is disclosed in Japanese Laid-Open Patent Publication No. 6-59163 (page 7, FIG. 1).

In view of the above, it will be apparent to those skilled in the art from this disclosure that there exists a need for an improved vehicle headrest apparatus. This invention addresses this need in the art as well as other needs, which will become apparent to those skilled in the art from this disclosure.

SUMMARY OF THE INVENTION

It has been discovered that in seatbacks that actuate the headrest using the inertia force of the seated passenger, the headrest unit does not begin moving forward until the rearward displacement of the passenger is large. Consequently, the head rest unit cannot be moved sufficiently forward during the period immediately after the collision (when the amount of displacement is still small). Thus, immediate response is not possible in this type of arrangement. In short, the head restraining action of the headrest is late and the head restraining effect is reduced when the passenger was in a forward-leaning posture at the time of the collision.

In headrests that use an airbag, the headrest until generates an explosive sound near the seated passenger's ears when it deploys the airbag. Thus, possibly imposing a severe stress on the passenger's ears.

In view of these shortcomings, the present invention seeks to provide a vehicle headrest apparatus that quickly and reliably restrains a seated passenger's head during a rear-end collision without utilizing the inertia force of the passenger's body by detecting the rear-end collision and pushing the headrest unit alone outward in the forward direction of the vehicle.

A vehicle headrest apparatus in accordance with the present invention basically comprises a headrest unit, a head restraining member, a swing/pushup force applying device, an auxiliary force adding device, a lock device and a controller. The headrest unit includes left and right headrest members dividing the headrest unit approximately midway in a transverse direction and a mounting member configured to swingably couple the left and right headrest members to an upper end part of a seatback by the mounting member. The left and right headrest members are configured to support a seated passenger. The head restraining member is operatively coupled to the left and right headrest members to move upward and toward a front of a vehicle in a deployment direction. The swing/pushup force applying device is configured and arranged to apply an urging force to swing the left and right headrest members upward and toward the front of the vehicle in the deployment direction of the head restraining member. The auxiliary force adding device is configured and arranged to apply an auxiliary urging force to the left and right headrest members in the deployment direction of the head restraining member. The lock device is operatively coupled to the left and right headrest members to hold the left and right headrest members in an initial storage position against the urging force applied by the swing/pushup force applying device and the auxiliary urging force applied by the auxiliary force adding device. The controller is operatively coupled to the lock device to release the lock device upon detecting a rear-end collision.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

As explained below in greater detail, the present invention is directed to a vehicle headrest apparatus that is configured to reliably restrain a passenger's head and suppress the rearward movement of a passenger's head when a rear-end collision occurs by actuating headrest unit itself.

First Embodiment

Figure 1:
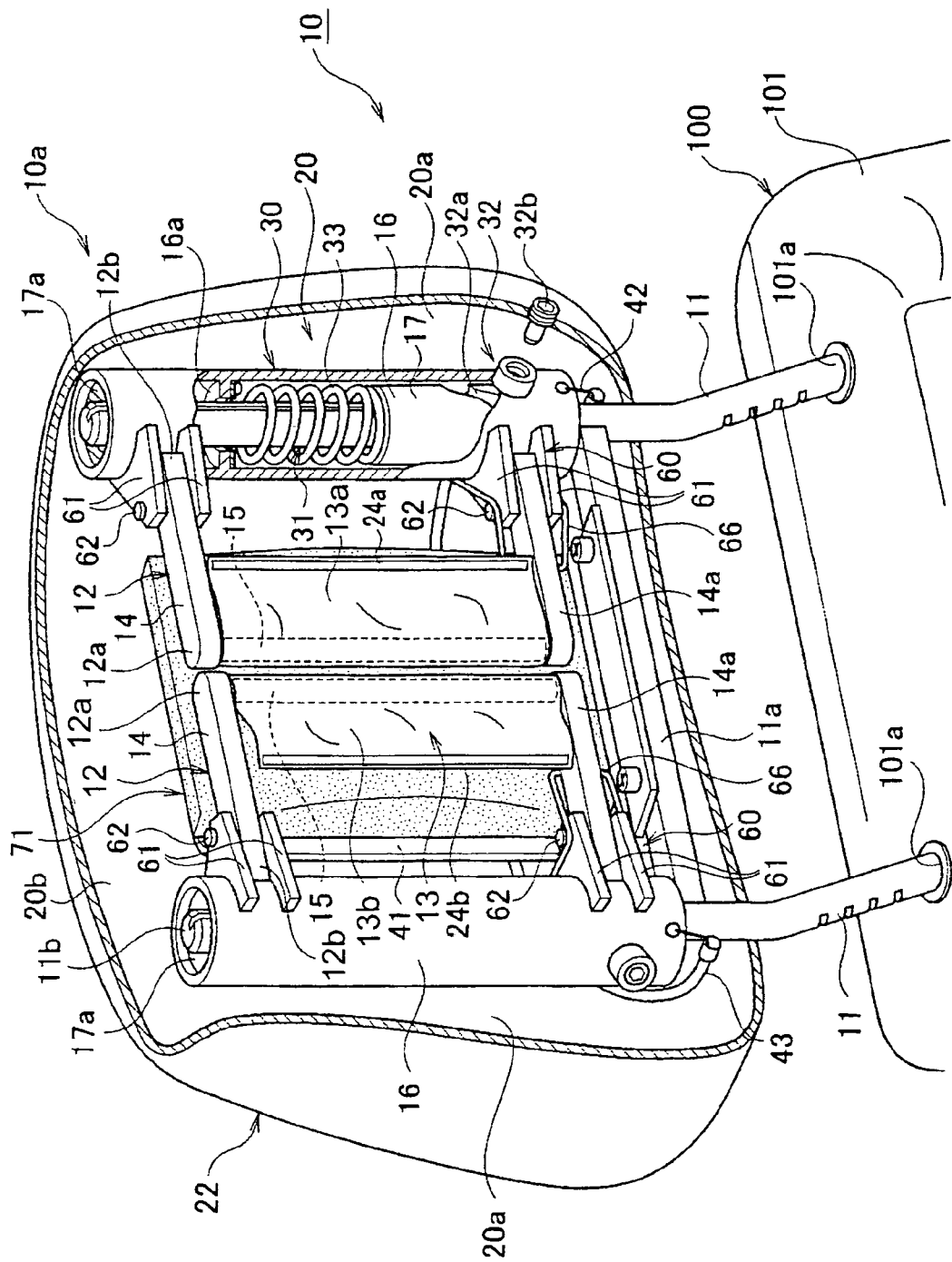
FIG. 1 is a front perspective view of a headrest unit in accordance with a first embodiment of the present invention when headrest unit is in the initial state with the head restraining member removed for purposes of illustration.
Figure 2:
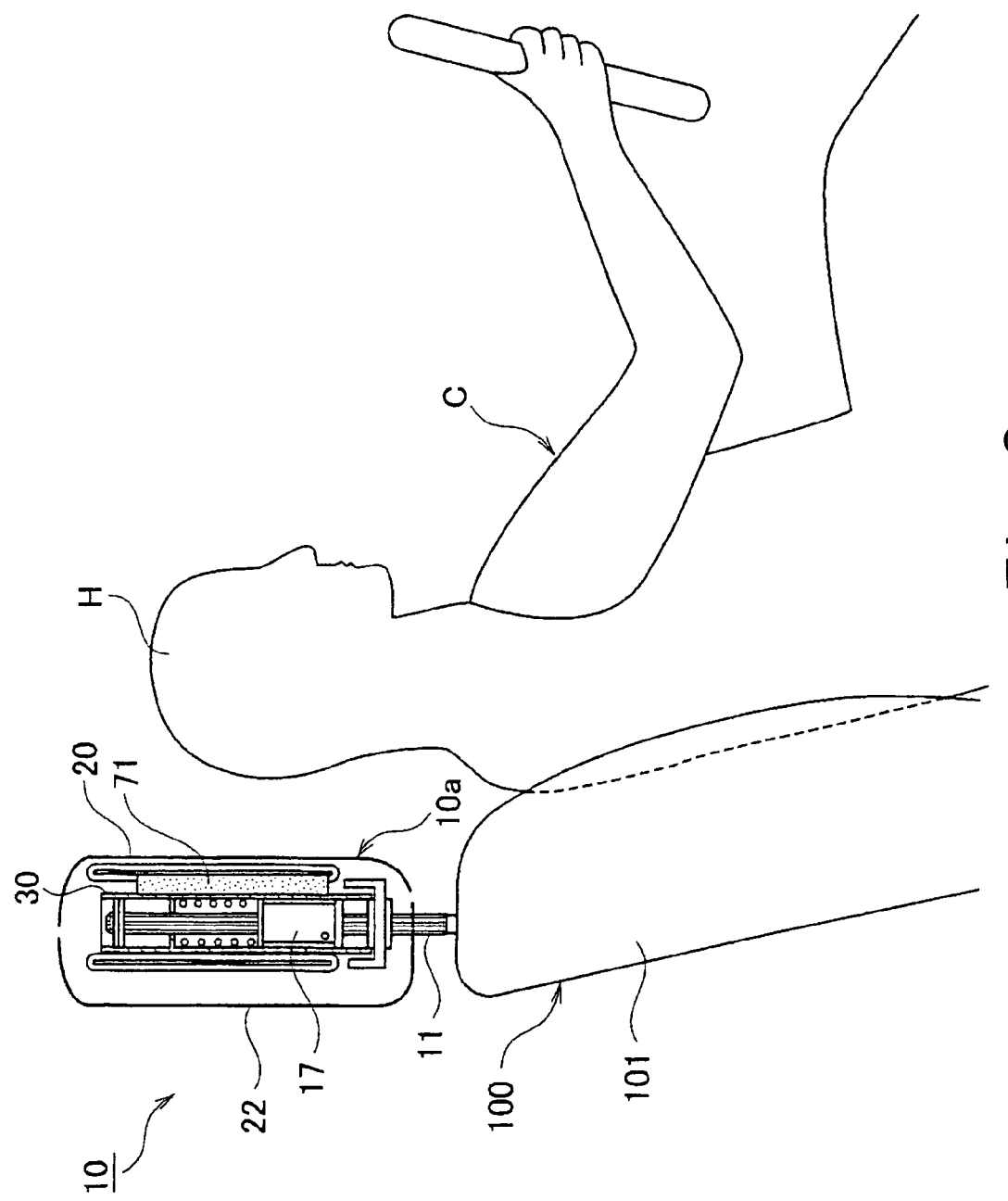
FIG. 2 is a simplified schematic side elevational view of the mounted state of the headrest unit in accordance with the first embodiment of the present invention.
Figure 3:
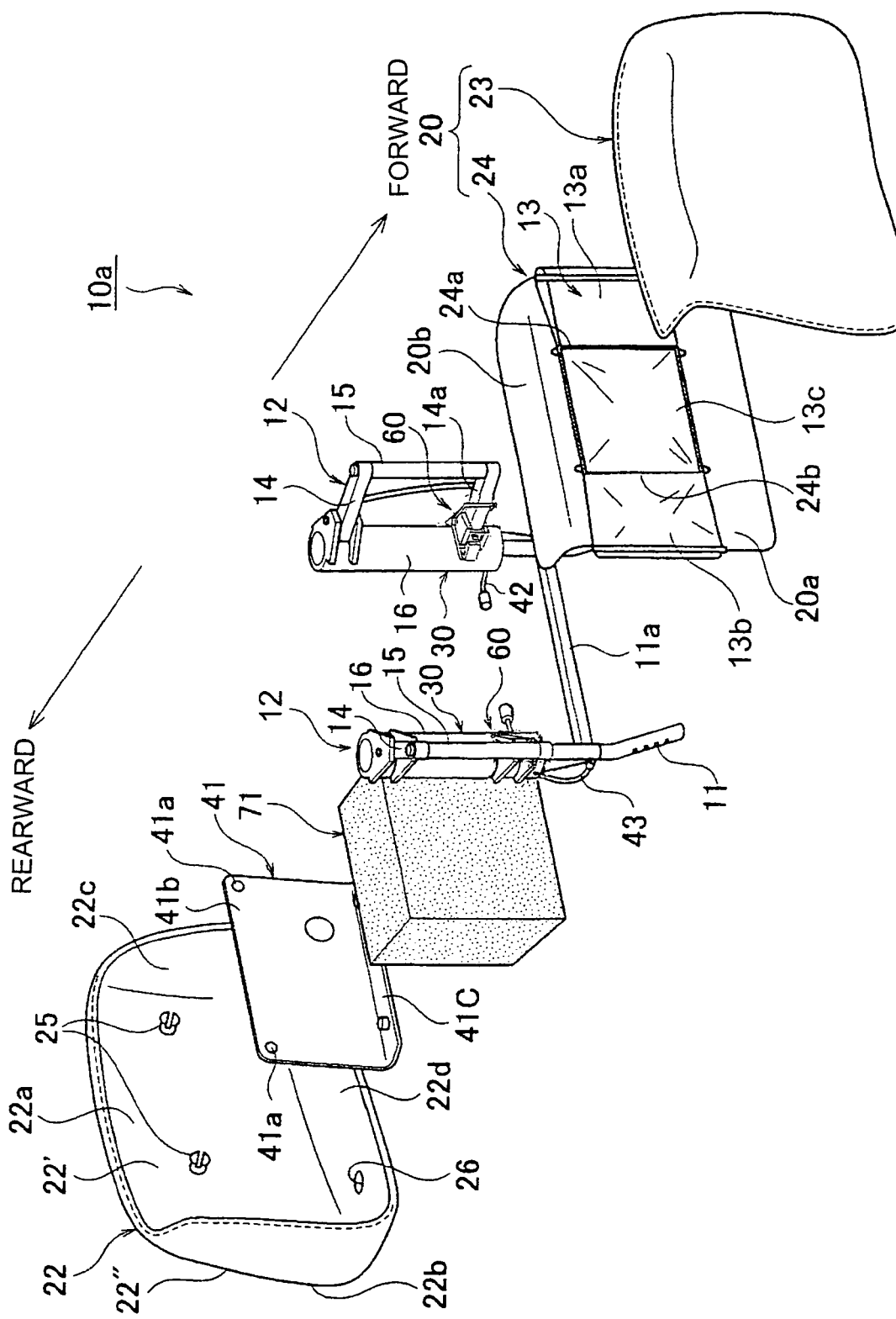
FIG. 3 is an exploded front perspective view of the headrest unit in accordance with the first embodiment of the present invention.
Figure 4:
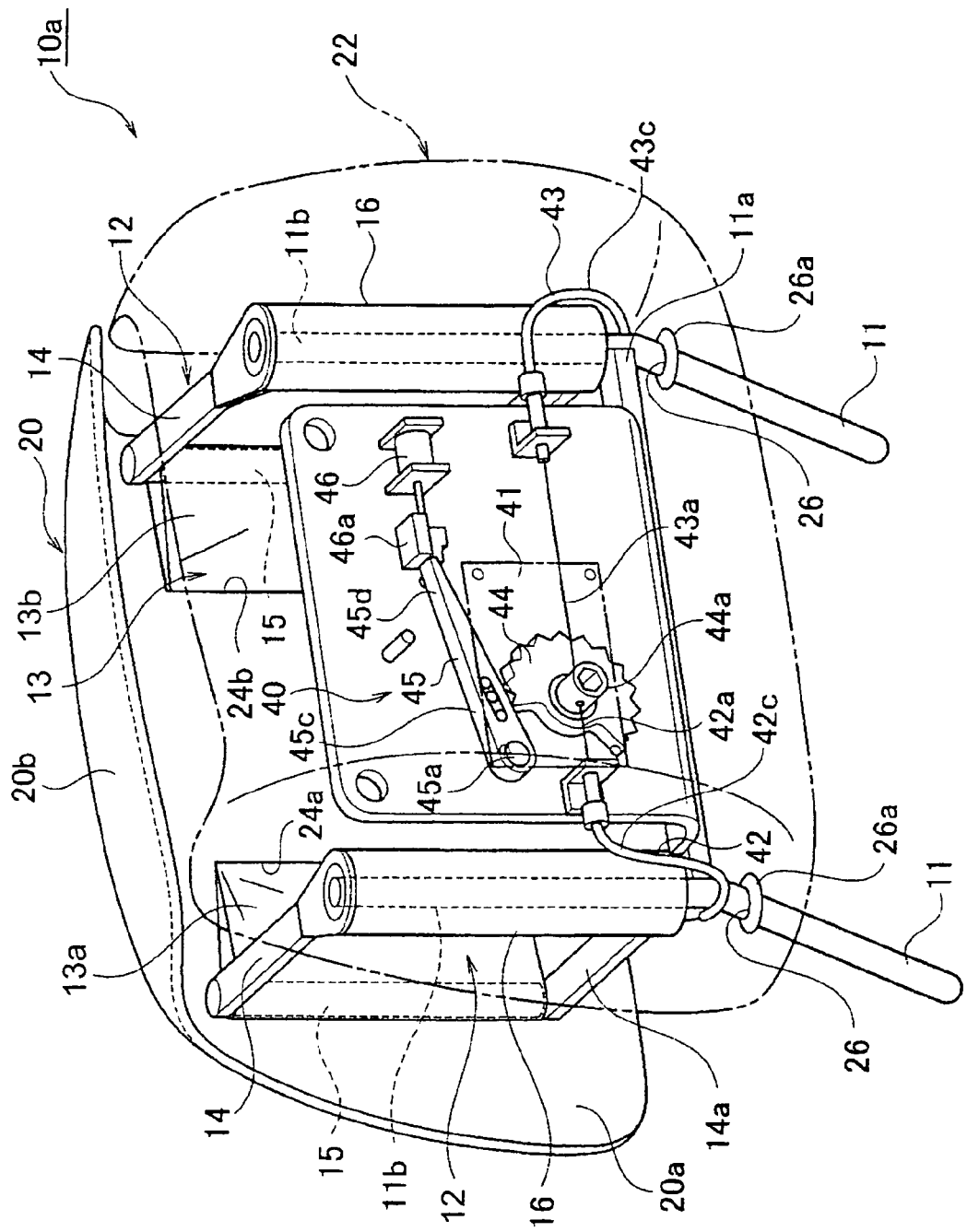
FIG. 4 is a simplified, exploded rear perspective view of the headrest unit (selected portions being transparent for purposes of illustration) in its extended or deployed state in accordance with the first embodiment of the present invention.

Referring initially to FIGS. 1 to 11, the vehicle headrest apparatus 10 is illustrated in accordance with a first embodiment of the present invention. FIG. 1 is a front perspective view of a headrest unit 10a in an initial state. FIG. 1 is a front perspective view of a headrest unit 10a when headrest unit 10a is in the initial state with the portions removed for purposes of illustration. FIG. 2 is a simplified schematic side elevational view of the mounted state of the headrest unit 10a. FIG. 3 is an exploded front perspective view of the headrest unit 10a. FIG. 4 is a simplified, exploded rear perspective view of the headrest unit 10a (selected portions being transparent for purposes of illustration) in its extended or deployed state.

As shown in FIGS. 1 to 4, the headrest unit 10a of this embodiment includes a mounting member comprising a pair of stays 11. The vehicle headrest apparatus 10 is adjustably coupled to a vehicle seat 100 by the stays 11. More specifically, the vehicle headrest apparatus 10 is attached to the upper end part of a seatback 101 of the vehicle seat 100. Thus, the headrest unit 10a is arranged to support the head H of a seated passenger C sitting in the vehicle seat 100 as seen in FIG. 2. The stays 11 of the headrest unit 10a are mounted in a pair of mounting holes 101a that formed in the upper end part of the seatback 101. The headrest unit 10a is mounted such that its vertical position can be adjusted relative to the upper end part of a seatback 101 of the vehicle seat 100 by the stays 11.

A connecting member 11a is welded to the bottom end parts of the stays 111 such that the connecting member 11a spans the space therebetween. The connecting member 11a serves to rigidly couple the stays 11 together as an integral unit. The headrest unit 10a is mounted to the projecting end parts 11b of the stays 11, which project upward from the connecting member 11a.

As shown in FIGS. 1–3, the headrest unit 10a basically comprises a pair of (left and right) headrest members 12, a thin flexible sheet member 13, a front cover 20, a back cover 22, a pair of swing/pushup force applying devices or mechanisms 30, and an expandable member or soft foam body 71. Thus, as shown in FIG. 3, the portion of the headrest unit 10a that supports the passenger's head H includes the front cover 20 covering the fronts of the headrest members 12 and the back cover 22 covering the backs of the headrest members 12. The thin flexible sheet member 13 and the front cover 20 serves as a head restraining member that can move forwardly and upwardly to restrain a passenger's head H. The soft foam body 71 functions as an auxiliary swing force adding device. The left and right headrest members 12 are mirror image of each others, and thus, the same reference numerals and symbols will be used for each of the headrest members 12.

As shown in FIG. 1, the headrest members 12 divide the headrest unit 10a in half at a point located approximately midway along the transverse dimension of the headrest unit 10a. Each of the headrest members 12 has an inner end part 12a and an outer end part 12b. The inner end parts 12a define the inner free ends of the headrest members 12. The outer end parts 12b are mounted to the stays 11 through the swing/pushup force applying devices 30 (which serve as a deployment mechanism) in such a manner that the left and right headrest members 12 can be deployed (swung). Thus, the left and right headrest members 12 can rise upwardly and swing forward due to a forward swinging force (toward the front of the vehicle) applied to the left and right headrest members 12 by the swing/pushup force applying devices 30.

As explained below, the headrest unit 10a also comprises a lock device or mechanism 40 (shown in FIG. 4) and a control system 50 (shown in FIG. 11) that operates the lock device or mechanism 40 to reliably restrain the passenger's head H and suppress the rearward movement of the passenger's head H when a rear-end collision occurs by actuating headrest unit 10a itself. Thus, when a rear-end collision occurs, the control system 50 releases the lock device or mechanism 40 to deploy the headrest members 12, which moves the thin flexible sheet member 13 and the front cover 20 forwardly and upwardly to reliably restrain the passenger's head H and suppress the rearward movement of the passenger's head H.

The flexible sheet member 13 is made of a pliable sheet material having a high tensile strength, such as canvas. When the flexible sheet member 13 is moved from an initial retracted position to a deployed position by the headrest members 12, the flexible sheet member 13 is expanded towards the passenger's head H. In particular, the flexible sheet member 13 is in a folded state when in the retracted storage position, and is under tension when in the extended or deployed state. The headrest members 12 include tensioning members for holding the flexible sheet member 13 in the expanded state such that the flexible sheet member 13 is under tension as discussed below. Thus, the sheet member 13 is arranged so as to span between the free end parts 12a of the headrest members 12.

As shown in FIGS. 1–3, a holding plate 41 is attached to the connecting member 11a for mounting the lock device 40 to the connecting member 11a. The holding plate 41 is configured and arranged to support the soft foam body 71. The holding plate 41 is also configured and arranged to be enclosed between the front cover 20 and the back cover 22.

Each of the headrest members 12 forms a generally rectangular frame portion comprising an upper horizontal frame member 14, a lower horizontal frame member 14a, a vertical frame member 15 and an outer cylinder 16. The upper and lower horizontal arms 14 and 14a are fixedly coupled to the vertical frame member 15 to form a rigid U-shaped tensioning member that is pivotally mounted to the outer cylinder 16. The outer cylinders 16 form the shells of the swing force applying devices 30. The rigid U-shaped tensioning members hold the flexible sheet member 13 in the folded state when in the retracted storage position, and in the expanded state when in the extended deployed position. The upper horizontal members 14 serve a horizontal tension applying device or member, while the vertical members 15 serve as a vertical tension applying device or member.

An inner cylinder 17 is joined in an integral manner to the outside of a bottom part of the projecting end part of each stay 11 (near the connecting member 11a) and a flange-shaped end plate 17a is joined to the upper end of each stay 11. The outer cylinders 16 are fitted closely around the outside circumference of the inner cylinders 17 and the endplates 17a in such a manner that they can rotate freely and move freely in the axial direction. Thus, the left and right headrest members 12 connected to the outer cylinders 16 can open and close about the inner cylinders 17 in the manner of a double-hinged door.

As shown in FIG. 4, the front cover 20 is installed so as to span across the inner end parts 12a of the left and right headrest members 12 and the flexible sheet member 13 is disposed therebetween to facilitate relative movement between the headrest members 12 and the front cover 20. The front cover 20 has a vertical leaf 20a that faces the head H of the passenger and a horizontal leaf 20b that extends rearward from the vertical leaf 20a and is substantially perpendicular to the upper edge of the vertical leaf 20a. The front cover 20 is configured and arranged so as to restrain the passenger's head H.

As shown in FIG. 3, the front cover 20 is provided with a front cover outer skin 23 and a front cover core material 24. The front cover outer skin 23 acts as a low-rigidity front layer that contacts the passenger's head H. The front cover outer skin 23 has an excellent deflection characteristic. The front cover core material 24 acts as a high-rigidity rear layer having an excellent load transmitting characteristic. A multilayered structure is obtained by bonding the front cover outer skin 23 and the front cover core material 24 together as an integral unit.

The front cover outer skin 23 is preferably made of cloth provided with a backing material of sponge or other buffer material. The front cover core material 24 is made of a thin-walled material having resilient characteristics with excellent shape-retaining performance, e.g., polycarbonate. The front cover outer skin 23 is bonded to the front surface of the thin-walled carbonate. The front cover core material 24 is formed such that its overall shape is that of a gently curved three-dimensional surface in which a center portion of the vertical leaf 20a is concave in such a manner as to substantially follow the contour of the back of the passenger's head H and the peripheral edge portion thereof is curved smoothly rearward.

The flexible sheet member 13 is provided on the rear face of the front cover 20, and is configured to be stretched between the inner end parts 12a when the left and right headrest members 12 are in the forwardly deployed state.

More specifically, the flexible sheet member 13 is a belt-shaped piece of cloth sewn into a loop form as shown in FIG. 3. The length of the loop is approximately equal to the transverse width of the front cover core material 24. Two vertical slits 24a and 24b of prescribed length L are provided in a portion of the front cover core material 24 corresponding generally to the center of the vertical leaf 20a.

One end 13a of the flexible sheet member 13 is inserted into one vertical slit 24b from the rear side of the front cover core material 24 and pulled through to the front side of the front cover core material 24. Then, the same end 13a is inserted into the other vertical slit 24a and pulled through to the rear side of the front cover core material 24. Therefore, the middle section 13c of the flexible sheet member 13 is disposed on the front side of the front cover core material 24 between the two vertical slits 24a and 24b and the two end parts 13a and 13b are disposed on the rear side of the front cover core material 24. Each of the end parts 13a and 13b on the rear side is loop-shaped. The flexible sheet member 13 is pinch-fixed or bonded at the portions thereof that pass through the vertical slits 24a and 24b such that the sheet-like member becomes integral with the front cover core material 24.

The vertical arms 15 of the left and right headrest members 12 are passed through the insides of the loop-shaped end parts 13a and 13b of the flexible sheet member 13. Since the vertical arms 15 are close together when the left and right headrest members 12 are in the initial state, the end parts 13a and 13b of the flexible sheet member 13 are folded inward toward the middle of the front cover core material 24 from the vertical slits 24a and 24b. When the left and right headrest members 12 are deployed forward, the end parts 13a and 13b are spread outward from the vertical slits 24a and 24b in a tensioned state.

Meanwhile, as shown in FIG. 3, the back cover 22 that covers the left and right headrest members 12 from the rear is provided with a back leaf 22a, a pair of side leaves 22b and 22c, and a bottom leaf 22d such that it covers a region including the back and sides of the left and right headrest members 12 and the under side of the connecting member 11a. The open upper portion is covered by the horizontal leaf 20b of the front cover 20. The back cover 22 comprises a thin-walled base section 22' made of polycarbonate or another synthetic resin and a cloth section 22" that is bonded to the outside of the base section and whose back side has been provided with a sponge backing. Several clips of fasteners 25 are provided so as to project forward from the back leaf 22a. Two through holes 26 are provided in the bottom leaf 22d for the stays 11 to pass through.

The back cover 22 is mounted by first passing the lower ends of the stays 11 through rubber bushings 26a and through the through holes 26 in the bottom leaf 22d and then inserting the fasteners 25 of the back leaf 22a into the mating holes 41a formed in the holding plate 41 of the lock device 40, which is fixed to the connecting member 1a.

Each of swing/pushup force applying devices 30 is equipped with a lift mechanism 31 that raises the left or right headrest member 12 with respect to the stay 11 and a swing mechanism 32 that swings the left or right headrest member 12 forward in conjunction with the raising action of the lift mechanism 31. Thus, while the left and right headrest members 12 are pushed upward by the lift mechanism 31, they are swung forward by the swing mechanism 32.

The lift mechanism 31 comprises a spring 33 compressed between the upper end face of the inner cylinder 17 and an annular reduced-diameter part 16a formed integrally on the inside of an upper part of the outer cylinder 16. A washer 34 is provided between the spring 33 and the reduced-diameter part 16a to facilitate good sliding.

Consequently, the outer cylinders 16 are constantly subjected to an upward pushing force applied by the respective springs 33. Thus, the left and right headrest members 12, which are supported on the outer cylinders 16, are also subjected to an upward pushing force.

As shown in FIG. 1, each swing mechanism 32 comprises a helical groove 32a formed in the outer circumference of the inner cylinder 17 and a bolt 32b that screws into the outer cylinder 16 and serves as a mating element.

The helical grooves 32a are slanted in such a direction that the left and right headrest members 12 are swung forward as they move upward and the tip end parts of the bolts 32b mate with the helical grooves 32a such that they can slide freely therein.

Thus, when the left and right headrest members 12 are pushed upward by the springs 33 of the lift mechanisms 31, the bolts 32b of the swing mechanisms 32 move upward while following the helical grooves 32a in inner cylinders 17. As a result, the outer cylinders 16, being integrally joined with the bolts 32b, deploy in such a manner as to push the left and right headrest members 12 open in the forward direction.

The amounts by which the left and right headrest members 12 swing can be established in advance by adjusting the slant angle of the helical grooves 32a. Likewise, amount of swing per amount of upward rise of the left and right headrest members 12 can also be adjusted by adjusting the slant angle of the helical grooves 32a.

The soft foam body 71 functions to add an auxiliary spring force in the deployment direction against the left and right headrest members 12. As best seen in FIGS. 1–3, the soft foam body 71 is arranged in a compressed state between the left and right headrest members 12 and the holding plate 41, which is fixed to the connecting member 11a. Thus, the soft foam body 71 is fixed indirectly to the stays 11 in such a manner as to be positioned rearward of the left and right headrest members 12.

In this first embodiment, a piece of urethane is used as the soft foam body 71. The piece of urethane forming the soft foam body 71 has the shape of a parallelepiped that is arranged between the left and right headrest members 12 and the holding plate 41.

Figure 6:
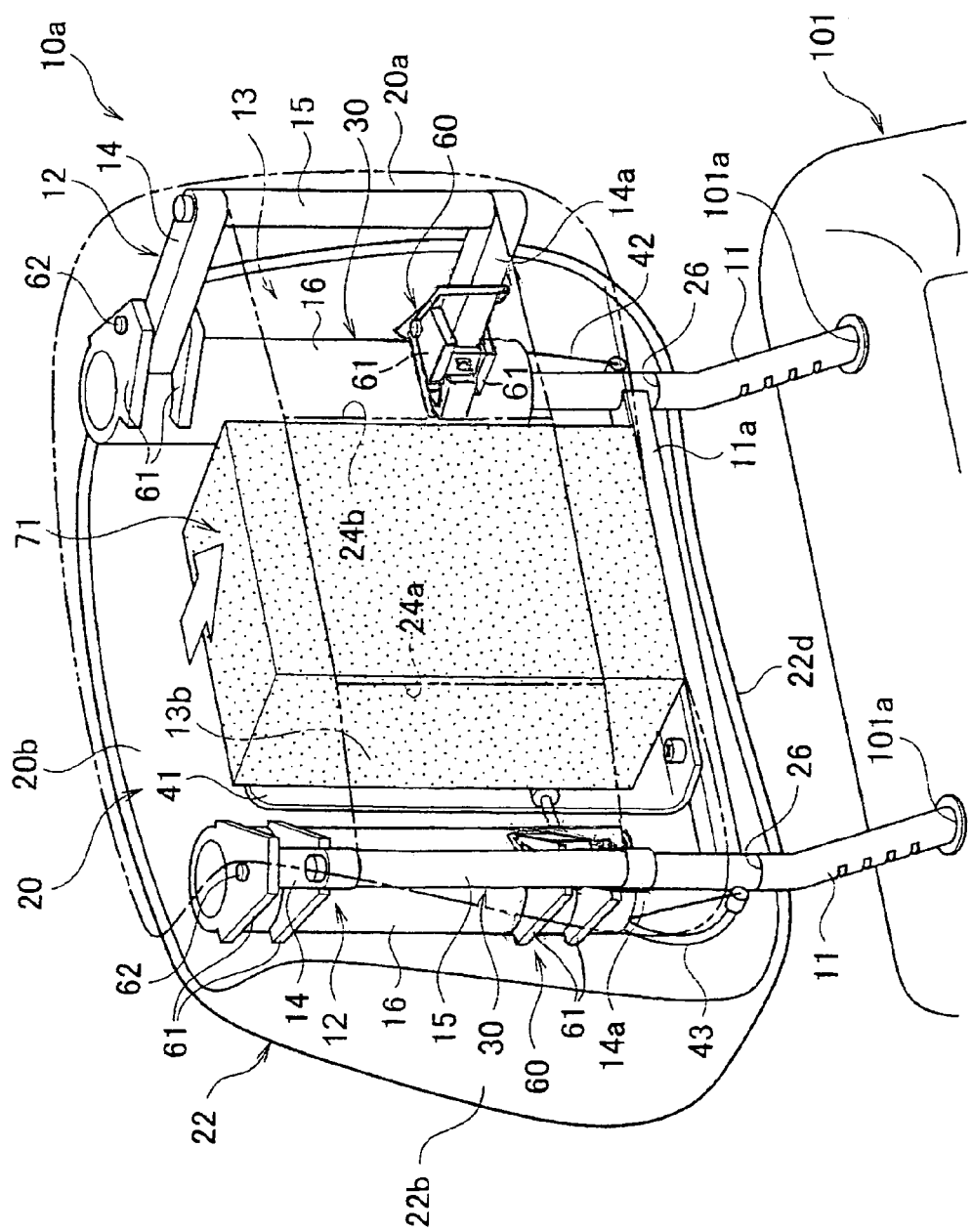
FIG. 6 is a front perspective view of the headrest unit (selected portions being transparent for purposes of illustration) of the first embodiment of the present invention in a mid-deployed state.
Figure 7:
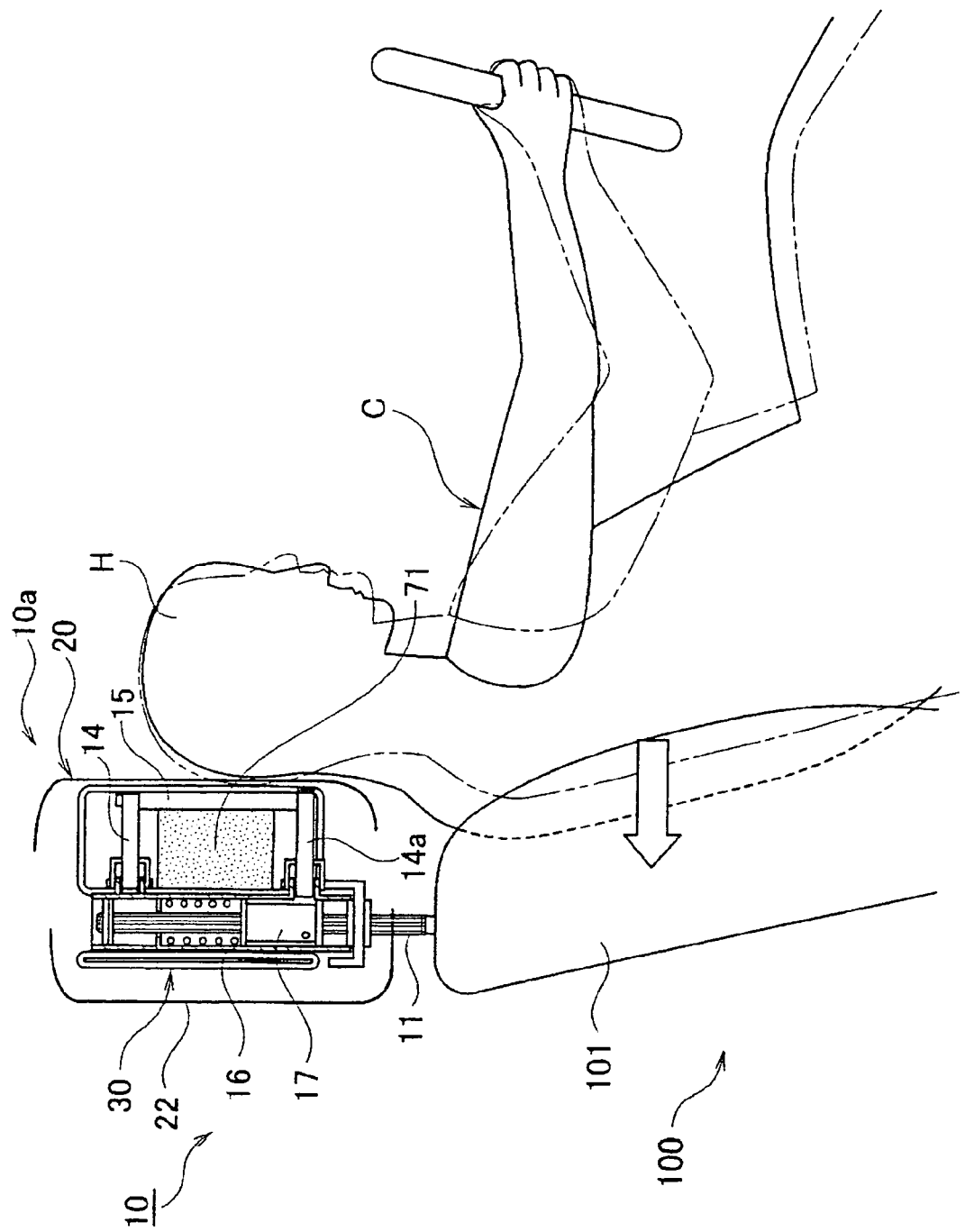
FIG. 7 is a simplified schematic side elevational view of the headrest unit in accordance with the first embodiment of the present invention showing the completely deployed state after a rear-end collision.
Figure 8:
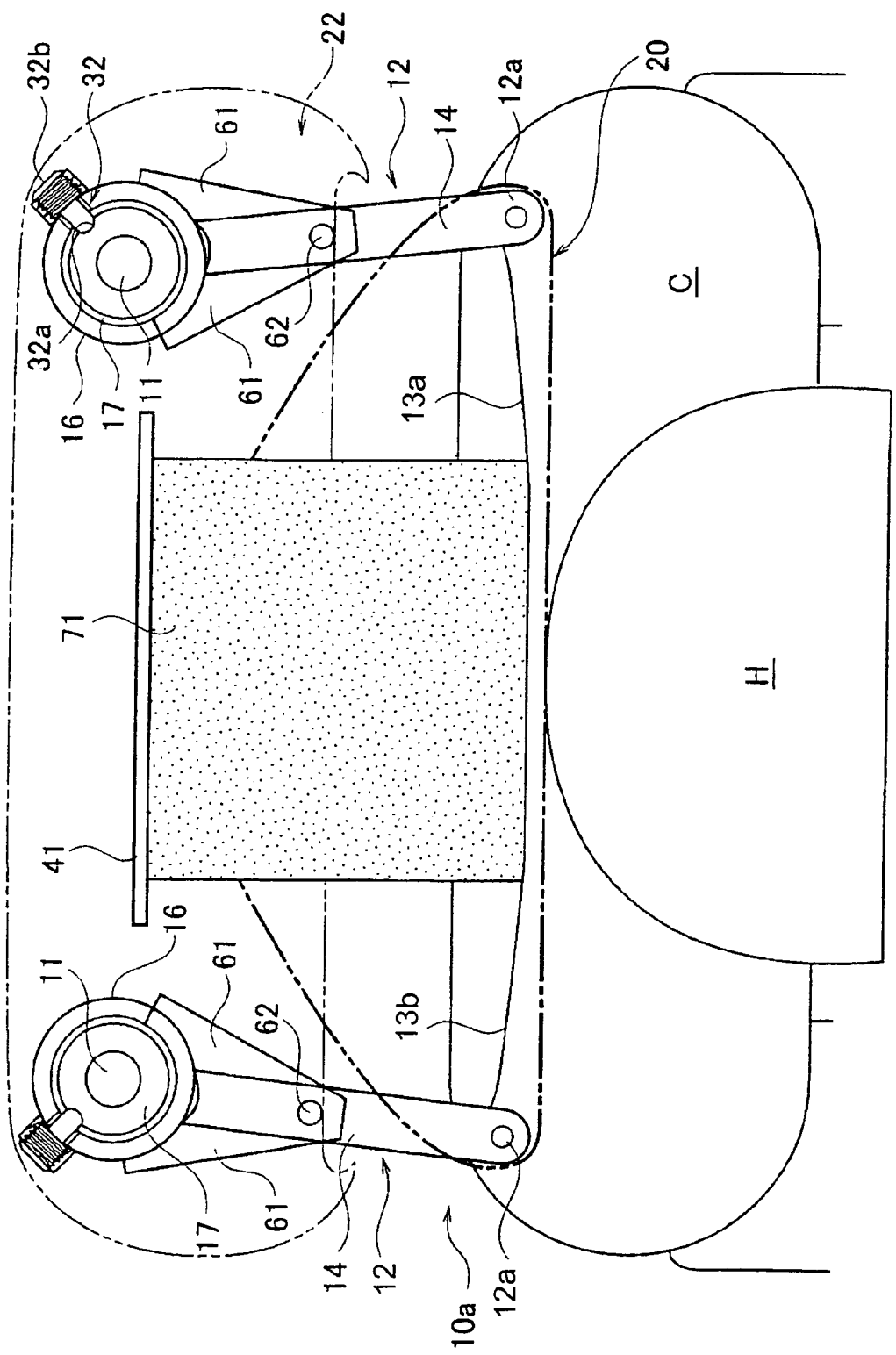
FIG. 8 is a simplified top plan view of the headrest unit (selected portions being transparent for purposes of illustration) of the first embodiment of the present invention in the completely deployed state immediately after a rear-end collision.

As shown in FIGS. 6–8, the natural or undeformed thickness of the soft foam body 71 in the lengthwise direction of the vehicle is set such that the piece of the urethane will apply a slight compressive force against the front cover 20 when the left and right members 12 are opened. Thus, the front cover 20 is pushed outward to its maximum forward position. In other words, when the left and right headrest members 12 are in the fully deployed state, the piece of urethane forming the soft foam body 71 supports the flexible sheet 13 and the front cover 20 with a large surface from the rear in a substantially uniform manner.

The lock device 40 is provided on top of a middle section of the connecting member 11a provided between the pair of stays 11 as shown in FIG. 4. The lock device 40 controls the locked state and the released state of the left and right headrest members 12. More specifically, the lock device 40 serves to control whether the left and right headrest members 12 are held in an initial position (FIG. 1) where they are locked to the stays 11 in resistance to the forces applied by the swing force applying devices 30, or released (FIG. 4) such that the swing force applying devices 30 can raise them upward and swing them forward.

As shown in FIG. 4, the lock device 40 basically includes the following components provided on the rear side of the holding plate 41: a pair of control wires 42 and 43, a gear or winding element 44, a link or lever member 45, and a solenoid or drive unit 46. The link 45 engages and disengages with respect to the gear 44, while the solenoid 46 controls the swing motion of the link 45. The wires 42 and 43 are operatively coupled to the left and right headrest members 12, respectively. As shown in FIG. 3, one end of each of the wires 42 and 43 is connected to a bottom part of one of the outer cylinders 30 by a pin. The other end of each of the wires 42 and 43 is releasably coupled to the gear 44.

As shown in FIG. 3, the holding plate 41 has a vertical mechanism mounting leaf 41b and a mounting flange 41c formed by bending the bottom edge of the vertical mechanism mounting leaf 41b into a horizontal orientation, thus giving the holding plate an L-shaped cross section. The mounting flange 41c is fastened to the upper surface of the connecting member 11a (which spans between the left and right stays 11) with bolts (not shown).

Figure 5:
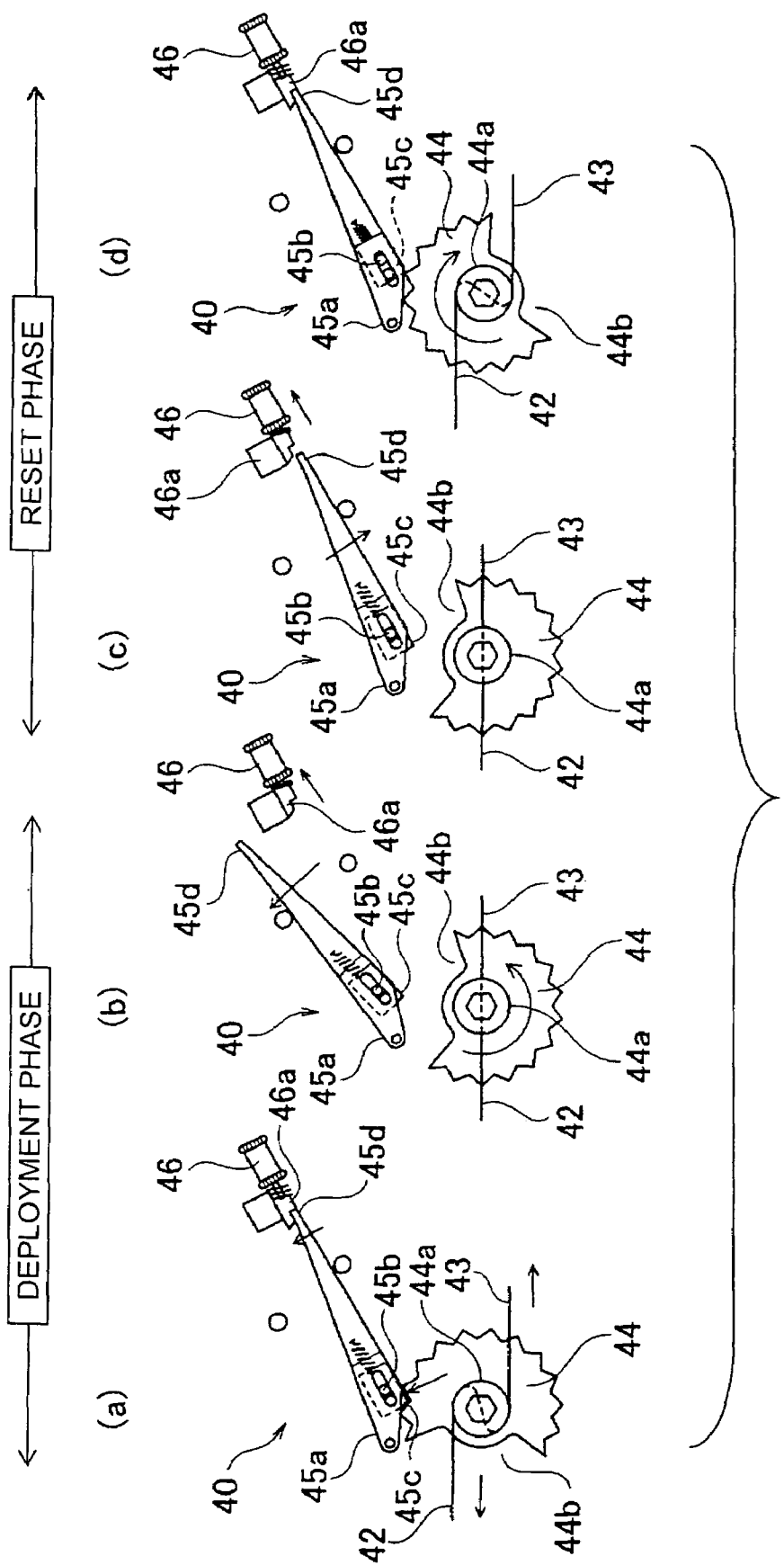
FIG. 5 is a sequential schematic view illustrating the operation of the lock device or mechanism of the first embodiment of the present invention in the order of steps (a) to (d)

As shown in FIGS. 4 and 5, the gear or winding element 44 is provided at the center with a small-diameter drum 44a for winding the wires 42 and 43. The gear 44 is mounted to the mechanism mounting leaf 41b of the holding plate 41 in such a manner that it can rotate freely. One end part 42a and 43a of each wire 42 and 43 is wound onto the drum 44a in the same rotational direction. The other end parts 42b and 43b of the wires 42 and 43 are each connected with a pin to a bottom part of a corresponding one of the outer cylinders 16 of the headrest members 12.

As shown in FIGS. 1 and 6, a middle portion of each wire 42 and 43 is enclosed in a flexible outer tube 42c and 43c such that the wire can be pushed and pulled there-within. When the left and right headrest members 12 are in the initial state (i.e., the un-swung state) shown in FIG. 1, the first end parts 42a and 43a of the wires 42 and 43 are wound fully onto the drum 44a and are tensioned by the force of the swing/pushup force applying devices 30.

As shown in FIGS. 4 and 5, the base end 45a of the link 45 is mounted in a freely pivotal manner to the holding plate 41 above the gear 44, and an intermediate section of the link 45 that is closer to the base end 45a than the other end is provided with a ratchet 45b having a mating claw 45c that engages and disengages with the gear 44.

FIG. 5 is a sequential schematic view illustrating the operation of the lock device 40 in the order of steps (a) to (d). As shown in FIG. 5, the mating claw 45c of the ratchet mechanism 45b mates with the gear 44 in such a manner as to oppose rotation in the direction (counterclockwise direction) that causes the wires 42 and 43 to unwind from the drum 44a but allow rotation in the direction (counterclockwise direction) that causes the wires 42 and 43 to be wound onto the drum 44a.

The solenoid 46 is arranged so as to face the tip end part 45d of the link 45 and is configured to extend and retract a mating portion 46a to and from the tip end part 45d. In the locked state shown in step (a) of FIG. 5, the current is OFF and the mating portion 46a is extended so as to mate with the tip end part 45d of the link 45. In the lock-released state shown in step (b) of FIG. 5, the current is ON and the mating portion 46a is retracted such that it disengages from the tip end part 45d of the link 45.

In the locked state shown in step (a) of FIG. 5, the mated condition of the gear 44 and the mating claw 45c is maintained and unwinding of the wires 42 and 43 is prevented. Thus, the outer cylinders 16 remain in such a rotational position that the left and right headrest members 12 are held in the initial state.

Meanwhile, in the lock-released state shown in step (b) of FIG. 5, the link 45 pops up due to the rotational force of the gear 44 and swings in the counterclockwise direction, causing the mating claw 45c to disengage from the gear 44. As a result, the wires 42 and 43 are allowed to unwind freely and the outer cylinders 16 are lifted and swung by the swing/pushup force applying devices 30 so as to lift up and swing forward the left and right headrest members 12.

Based on the amount by which wires 42 and 43 are wound onto the gear 44, there is a portion of the gear where gear teeth are not required. To prevent the mating claw 45c from catching at some point along this portion, a cut-away portion 44b is provided to eliminate the unnecessary teeth.

The lock device 40 can be reset after it has allowed the left and right headrest members 12 to be deployed. The link 45 is swung clockwise from the lock-released state shown in step (b) of FIG. 5 to the position shown in step (c) of FIG. 5 and the mating portion 46a of the solenoid 46 is mated with the tip end portion 45d of the link as shown in step (d) of FIG. 5.

With the mating portion 46a thus engaged, the gear 44 is rotated clockwise against the force of the swing/pushup force applying devices 30 such that the wires 42 and 43 are wound up and the lock device 40 is returned to the initial state shown in step (a) of FIG. 5.

Figure 11:
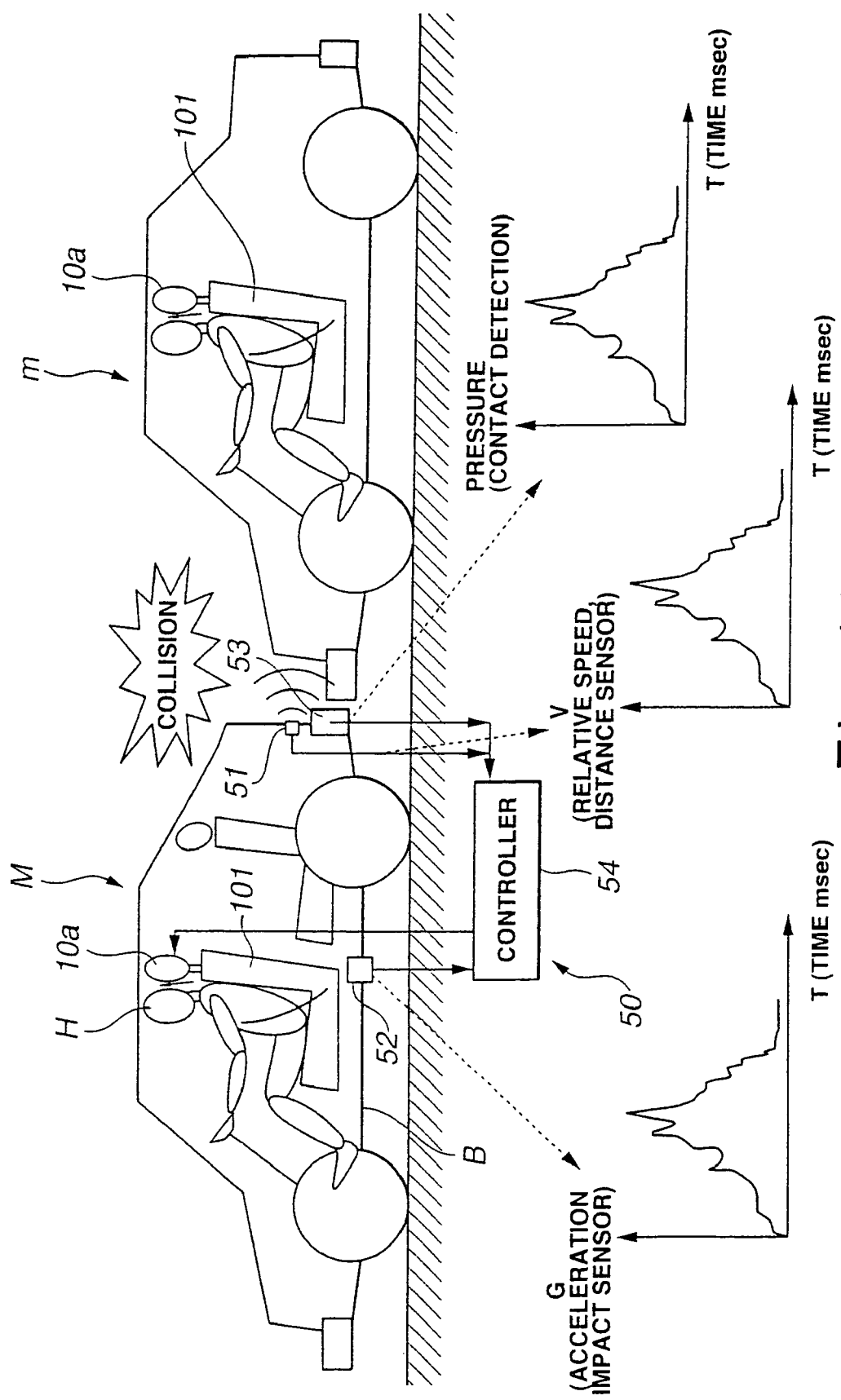
FIG. 11 is a schematic view illustrating the actuation system of the controller of the first embodiment of the present invention.

As shown in FIG. 11, the control system 50 comprises a V-sensor 51, a G-sensor 52, a pressure sensor 53 and a controller 54. The V-sensor 51 is provided on the rear end of the vehicle M which is installed with the present invention, and detects the relative velocity with respect to a following vehicle m using sound waves or the like. The G-sensor 52 detects the deceleration of the vehicle body B. The pressure sensor 53 that is provided on the rear bumper of the vehicle M detects the contact pressure of the following vehicle m. The controller 54 receives signals from these sensors 51, 52 and 53. The controller 54 applies a current to the solenoid 46 so as to release the lock device 40.

The controller 54 preferably includes a microcomputer with a control program that controls the drive unit or solenoid 46 as discussed below. The controller 54 can also include other conventional components such as an input interface circuit, an output interface circuit, and storage devices such as a ROM (Read Only Memory) device and a RAM (Random Access Memory) device. The microcomputer of the controller 54 is programmed to control the lock device 40 in response to the detection signals from the sensors 51, 52 and 53. The controller 54 is capable of selectively controlling any of the components of the control system 50 in accordance with the control program. It will be apparent to those skilled in the art from this disclosure that the precise structure and algorithms for the controller 54 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Although in this embodiment, the G-sensor 52 and the pressure sensor 53 are used to detect a collision in a direct manner, it is also possible to use a touch sensor or a strain gauge (not shown in figure).

Figure 18:
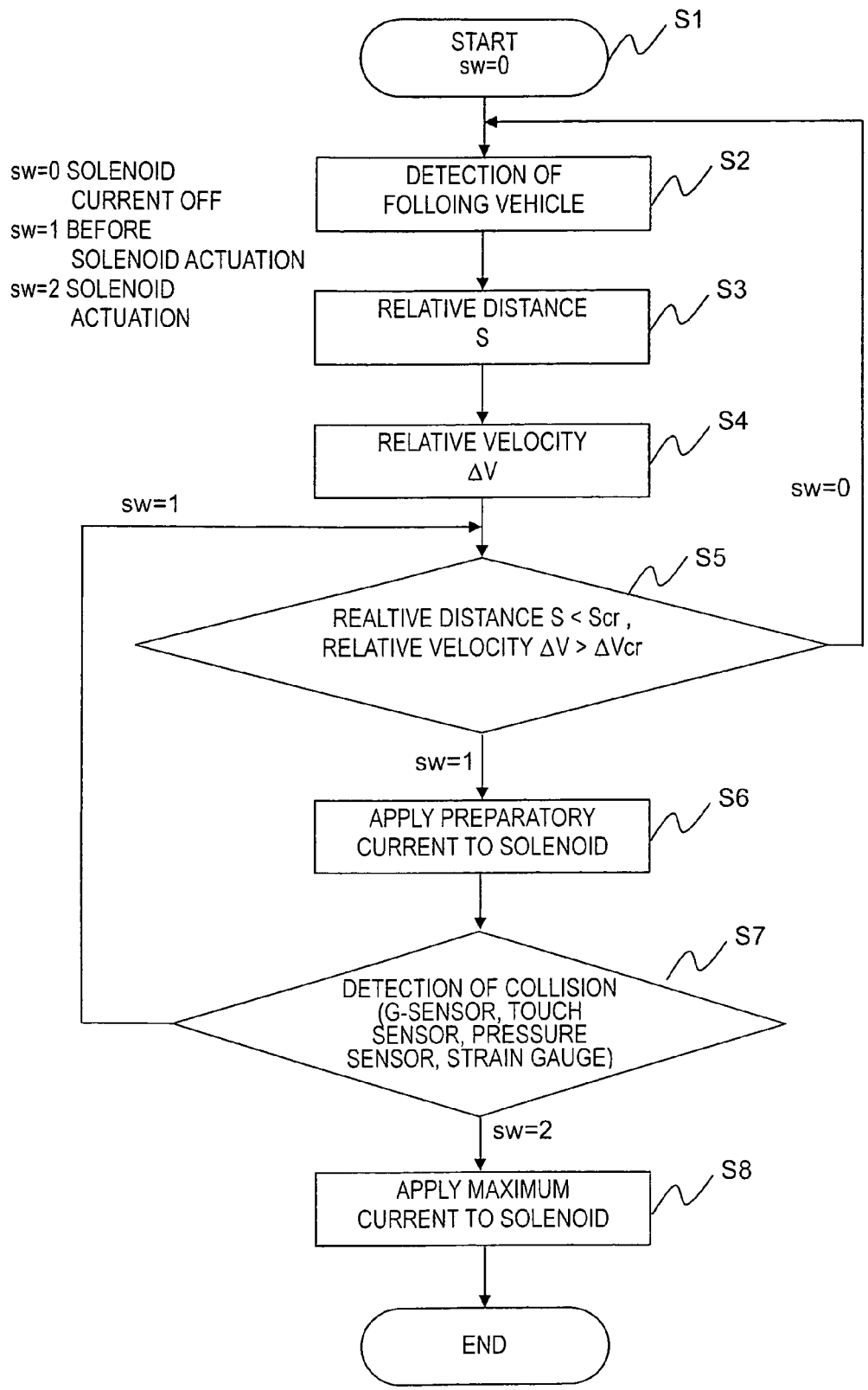
FIG. 18 is a flowchart explaining the control of the lock device or mechanism used in each of the illustrated embodiments of the present invention.

The controller 54 executes, for example, the controls presented in the flowchart of FIG. 18.

First, in step S1 control of the headrest apparatus 10 commences when the ignition switch is turned ON. At this stage, the current (solenoid drive current) supplied to the solenoid 46 is OFF.

Next, in step S2, the controller 54 detects the following vehicle m based on the detection signal of the V-sensor 51. In step S3, the same detection signal is used to calculate the relative distance S between the vehicle M installed with the present invention and the following vehicle m. In step S4, the controller 54 calculates the relative velocity $\Delta V$ between the two vehicles M and m.

Figure 19:
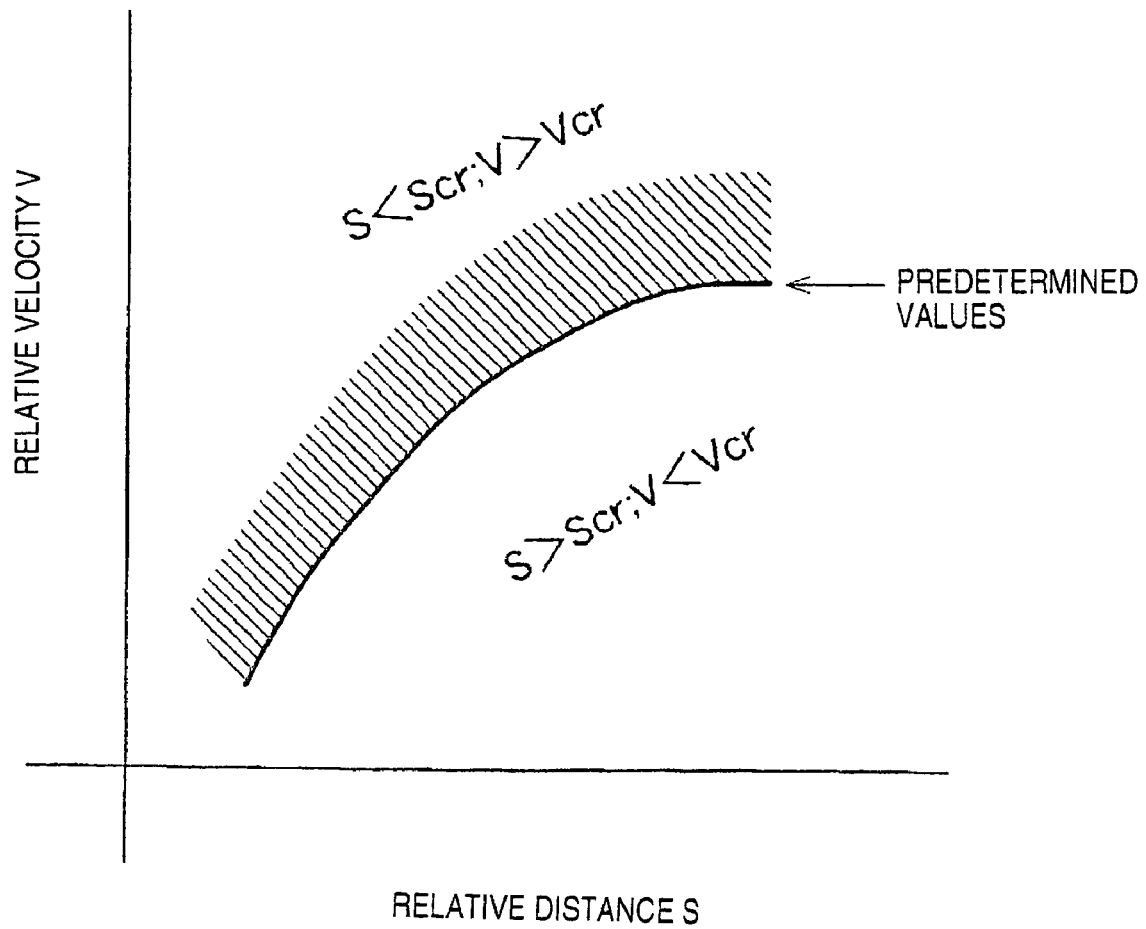
FIG. 19 is a graph for describing the region in which the lock device or mechanism of the illustrated embodiments of the present invention is released based on the relative distance and relative velocity.

In step S5, the controller 54 uses the control map shown in FIG. 19 to calculate the relationship between the relative distance S and relative velocity $\Delta V$ found in steps S3 and S4 and the preset relative distance Scr and relative velocity $\Delta V$cr.

If the two conditions S<Scr and V>Vcr are both satisfied, the controller 54 estimates that the following vehicle m will collide with the rear end of the vehicle M and proceeds to step S6. Otherwise, the controller 54 returns to step S2.

In step S6, a current (solenoid drive preparatory current) smaller than the actual drive current is applied to the solenoid 46 of the lock device 40 in order to raise the operational response of the solenoid 46 in advance.

Then, in step S7, one sensor from among the G-sensor 52 and the pressure sensor 53, or the touch sensor and strain gauge, is used to detect if the vehicle M has actually experienced a rear-end collision. In step S8, actual solenoid drive current (maximum current) is applied to the solenoid 46. As a result, the lock device 40 is put into the released state.

As shown in FIG. 3, the swing mechanisms 32 of this embodiment are each provided with a fastening or resistance mechanism 60 that hold the left and right headrest members 12 in place relative to the stays 11 against rearward pressing forces acting on the front cover 20.

The fastening mechanisms 60 fix the left and right headrest members 12 to the stays 11 when a rearward pushing force applied to the left and right headrest members 12. The fastening mechanisms 60 are coupled between the lower horizontal members 14 of the left and right headrest members 12 and the outer cylinders 16. Each fastening mechanism 60 includes a pair of brackets 61, which are fixedly connected to the outer cylinders 16 and a pin 62 that pivotally supports one of the horizontal members 14 for permitting the lower horizontal member 14 to swing freely forward and rearward within a prescribed angle.

As shown in FIG. 1, the upper and lower horizontal arms 14 and 14a of each headrest member 12 are separated from the outer cylinder 16 at the ends thereof that correspond to the opposite end parts 12b of the headrest members 12. The horizontal arms 14 ands 14a are coupled to the brackets 61 (which are fixed to the outer cylinders 16) with the pins 62 such that they can swing freely forward and rearward.

Figure 9:
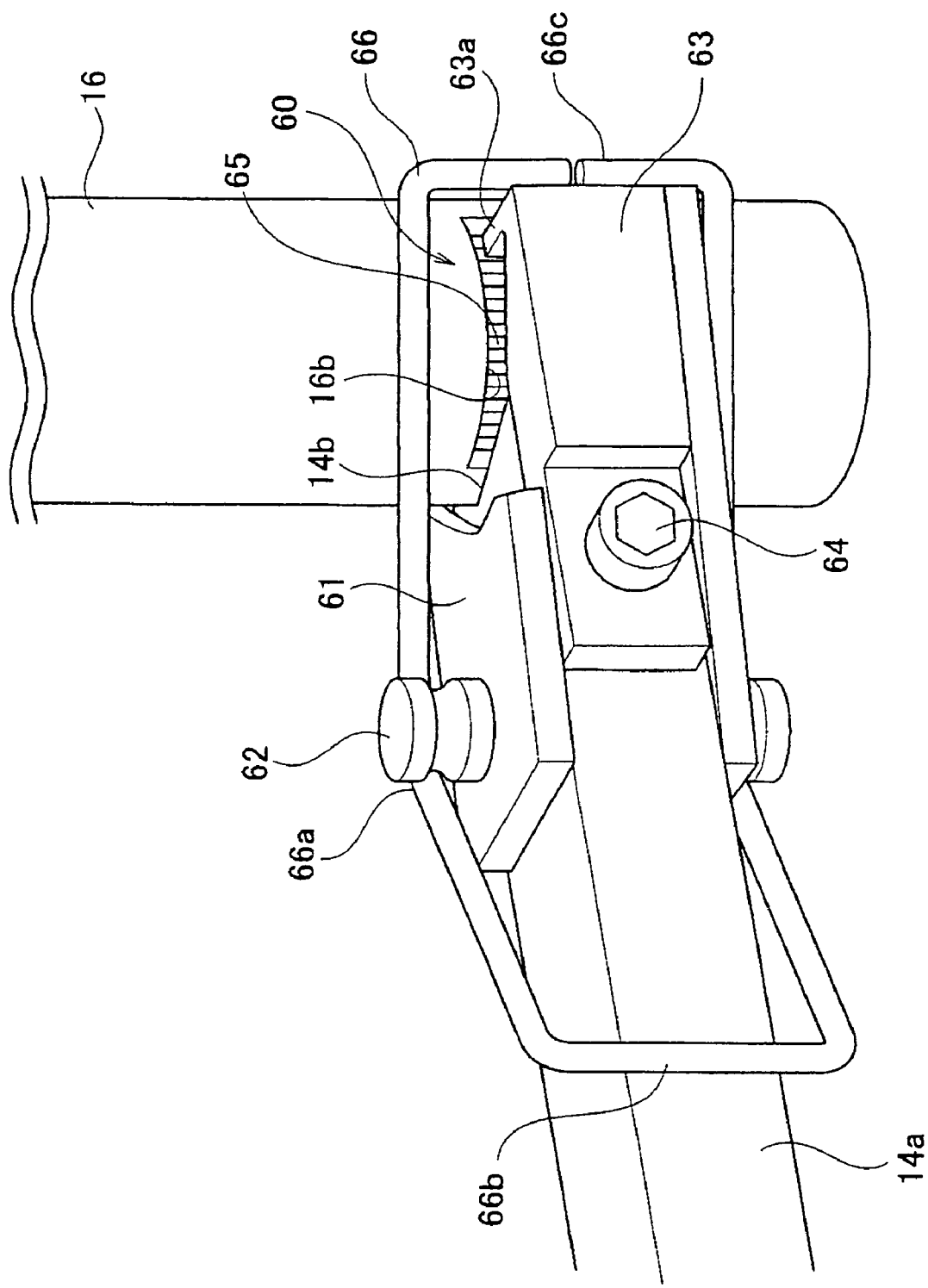
FIG. 9 is an enlarged rear perspective view of the fastening or resistance mechanism of the first embodiment of the present invention.
Figure 10:
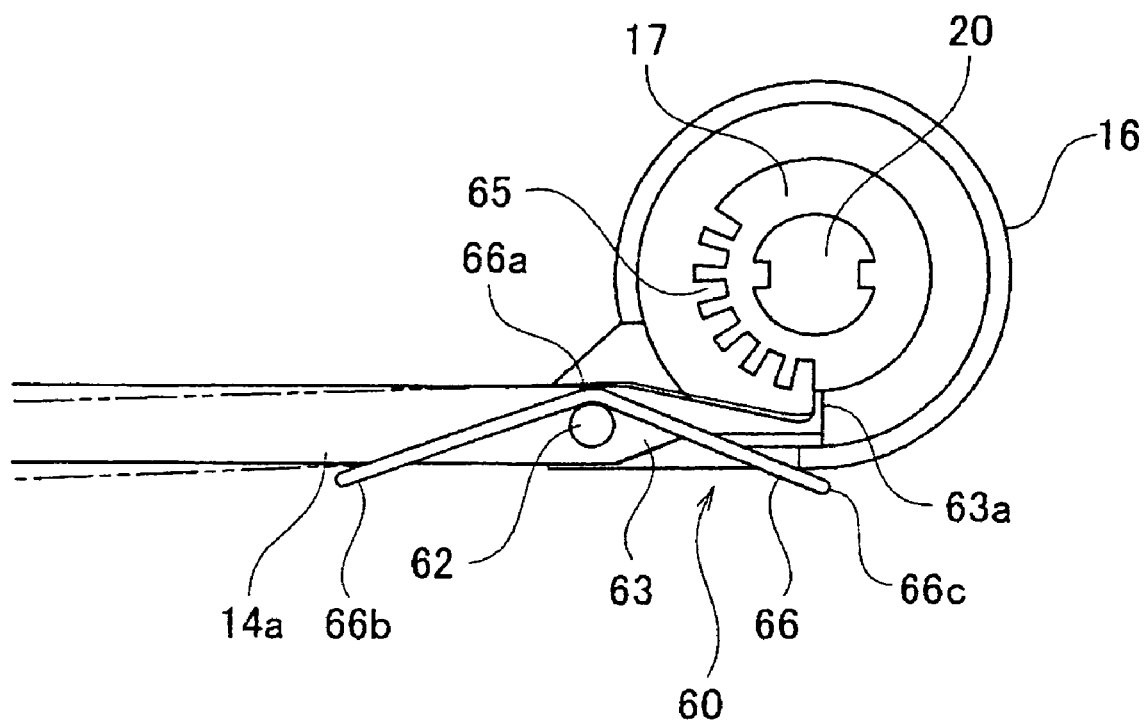
FIG. 10 is a simplified schematic cross-sectional view of the main components of the fastening or resistance mechanism in the first embodiment of the present invention.

As shown in FIGS. 9 and 10, a mating member 63 that projects substantially to the center portion of the outer cylinder 16 is fastened with a bolt 64 to the rear side of the end of each lower horizontal arm 14a that is closer to the outer cylinder. A window part 16b is provided in each of the outer cylinders 16 through which a claw 63a of the mating member 63 passes.

Each inner cylinder 17 has a rack 65 that is arranged to align with the window part 16b of the outer cylinder 16. The rack 65 has a plurality of tooth parts that selectively mates with the claw part 63a of the mating member 63. This rack 65 is formed over the entire circumferential length of the inner cylinder 17.

A generally rectangular spring 66 is arranged between each of the lower horizontal members 14 and each of the outer cylinders 16 as shown in FIG. 11. This spring 66 applies a forward pushing force against the horizontal members or arm 14 and 14a.

The spring 66 is made of spring steel wire-rod stock shaped into a generally rectangular form and bent into an obtuse V-shape along two opposing sides. As shown in FIG. 9, a central bent portion 66a of the spring 66 is stopped against the front side of the pin 62 so as to act as a fulcrum. A first end part 66b of the spring 66 is stopped against the rear side of the horizontal member 14, while a second end part 66c of the spring 66 is stopped against the rear side of the outer cylinder 16. As a result, a forward spring force is generated between the two end parts 66b and 66c.

Figure 13:
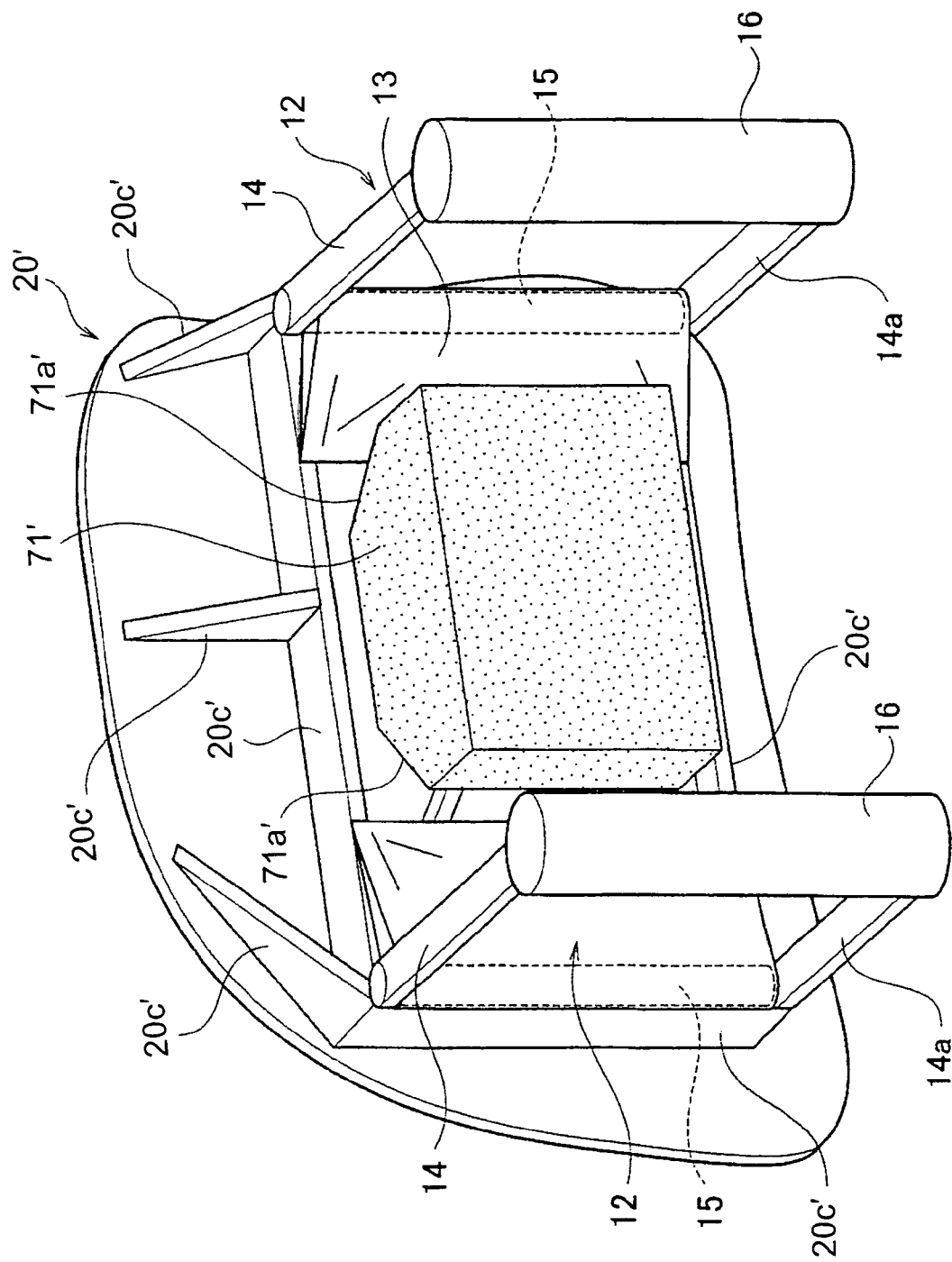
FIG. 13 is a simplified rear perspective view of a head restraining member in accordance with a second embodiment of the present invention.

Due to the spring force of the spring 66, the fastening mechanism 60 puts the upper and lower horizontal arms 14 and 14a into a constant state of being swung forward about the pin 62, as indicated by the broken lines in FIG. 13. In this state, the claw 63a of the engaging member 63 is disengaged from the rack 65 and the outer cylinder 16 can rotate freely with respect to the inner cylinder 17, except to the extent that the locking device 40 holds the outer cylinder 16 from rotating.

The prescribed angle or amount by which the horizontal members or arms 14 and 14a swing about the pins 62 is small, and is defined by one of the two end corners of the V-shaped recessions 14b, which are formed in the respective ends of the horizontal members 14 that face outer cylinders 16, touching against the outer circumference of the outer cylinders 16.

When the head H of a seated passenger touches against the left and right headrest members 12 and a rearward pushing force acts on the left and right headrest members 12, the upper and lower horizontal arms 14 and 14a swing rearward against the spring force of the springs 66. As a result, the claws 63a of the mating members 63 mate with the racks 65 and the outer cylinders 16 are locked to the inner cylinders 17.

Thus configured, the vehicle headrest apparatus 10 in accordance with the present embodiment detects when a following vehicle m collides with the rear end of the vehicle M (as shown in FIG. 1) using the V-sensor 51, the G-sensor 52, and the pressure sensor 53. As mentioned above, a touch sensor and a strain gauge (not shown) can also be used. When a collision is detected, the controller 54 applies a current to the solenoid 46 of the lock device 40.

When the lock device 40 is released, the swing/pushup force applying devices 30 push the left and right headrest members 12 upward while also deploying the left and right headrest members 12 forward, as shown in FIGS. 6 to 8.

When the left and right headrest members 12 swing forward, they spread and tension the flexible sheet member 13 and also push the front cover 20 diagonally upward and forward. Thus, the head H of a seated passenger C can be restrained even more quickly against large rearward movement caused by inertia force when a rear-end collision occurs.

The deployment of the left and right headrest members 12 is actuated by detecting the rear-end collision of the vehicle M, not detecting the load fluctuation caused by the inertia of the seated passenger C, and only the left and right headrest members 12 and the front cover 20 are deployed. As a result, the headrest unit 10a can be deployed and the head H of the seated passenger C can be restrained rapidly and reliably regardless of the weight or sitting posture of the passenger.

This arrangement enables the passenger's head H to be restrained more promptly than arrangements in which the entire headrest unit 10a is pushed forward because the head restraining member alone can be pushed out quickly and reliably and because the rear collision is not detected based on the load fluctuation resulting from the inertia of the passenger's body.

In this embodiment, the piece of urethane 71 applies an auxiliary spring force against the left and right headrest members 12 in the deployment direction in addition to the swing force exerted by the swing/pushup force applying devices 30. As a result, the deployment speed of the left and right headrest members 12 is increased and the time required for initial contact between the front cover 20 and the passenger's head H is shortened, thus enabling the passenger's head H to be restrained very quickly.

Also, in the vehicle headrest apparatus 10 of the first embodiment, the soft foam (urethane) body 71 is arranged in a compressed state between the left and right headrest members 12 and the holding plate 41, which is fixed to the stays 11 in such a manner as to be positioned rearward of the left and right headrest members 12. As a result, the following additional operational effect is obtained: the reaction force of the compressed soft foam (urethane) body 71 can be securely born by the holding plate 41 when the left and right headrest members 12 are in the initial state and the compressive force, i.e., the auxiliary spring force, of the soft foam (urethane) body 71 can be applied efficiently to the left and right headrest members 12 when a rear collision occurs.

By using urethane with a large compressibility as the soft foam body 71 in this embodiment, the volume occupied by the soft foam (urethane) body 71 when it is installed between the left and right headrest members 12 and the holding plate 41 can be reduced considerably. As a result, the amount by which the size of the headrest unit 10a increases due to the use of the soft foam (urethane) body 71 can be minimized.

When the left and right headrest members 12 are in the fully deployed state, the soft foam (urethane) body 71 supports the front cover 20 with a large surface from the rear in a substantially uniform manner. As a result, the soft foam (urethane) body 71 can function as an impact absorbing body even when the front cover 20 is fully deployed forward and can reduce the punching force that results when the passenger's head H contacts the forwardly deployed front cover 20.

Figure 12:
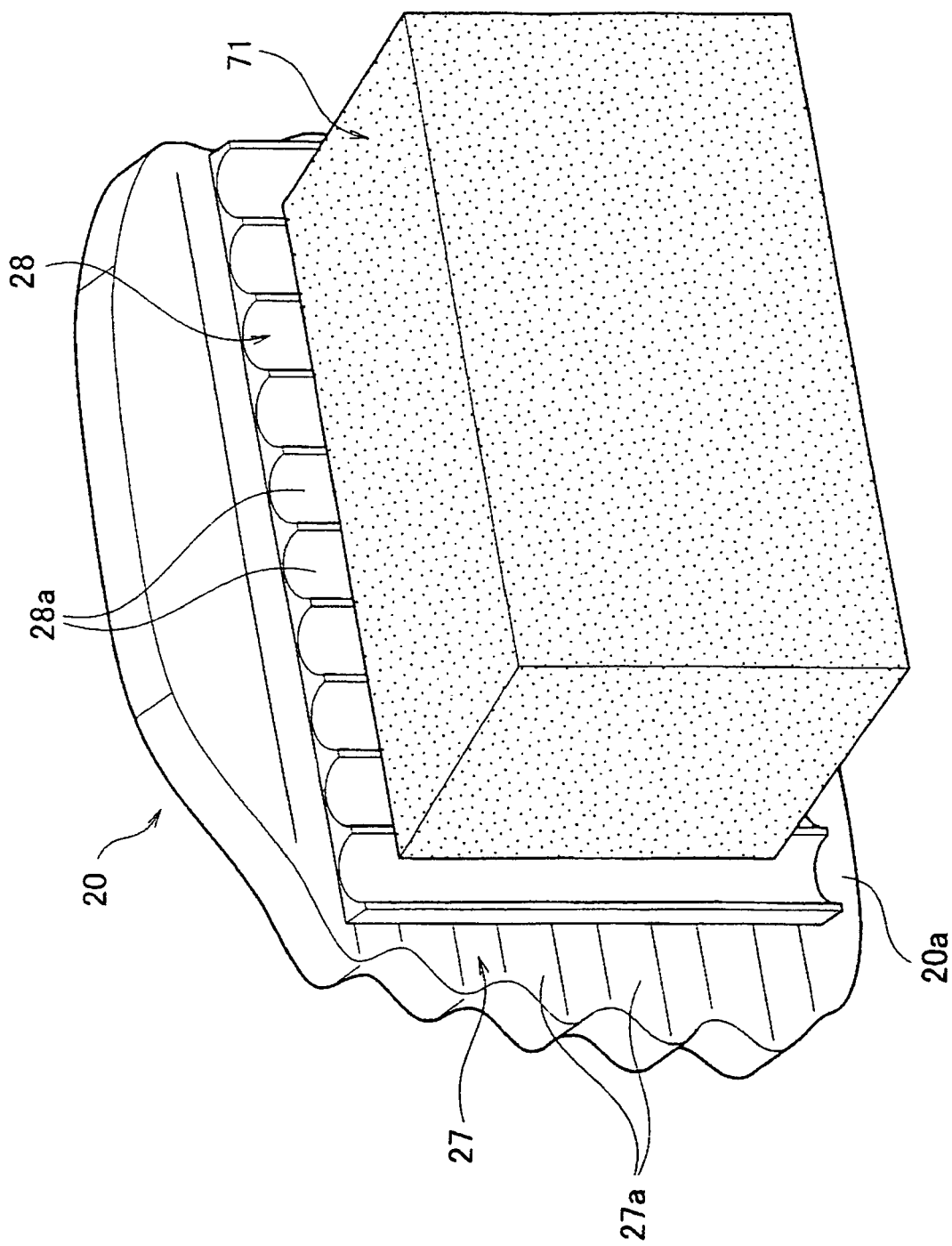
FIG. 12 is simplified partial rear perspective view of the main components of modified rear cover for the head restraining member in accordance with the first embodiment of the present invention.

Although the rear surface of the front cover 20 is flat in the first embodiment, the thickness and weight of the front cover 20 can be reduced and the bending rigidity of the same can be increased by providing the vertical leaf 20a of the front cover 20 with a horizontally undulated part 27 having horizontal undulations 27a that run in the transverse direction and, to the rear of the horizontally undulated part 27, providing a vertically undulated part 28 having vertical undulates 28a that run in up and down. FIG. 12 is rear perspective view showing the main components of such an arrangement.

Second Embodiment

Referring now to FIG. 13, a vehicle headrest apparatus in accordance with a second embodiment will now be explained. FIG. 13 is a rear perspective view of a modified front cover 20' with a soft form body 71' in the form of a piece of urethane 71' in its natural or undeformed state. Basically, in this embodiment, the cover 20' with the soft foam body 71' is substituted for the cover and the soft foam body 71' of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

In the second embodiment, as shown in FIG. 13, the soft foam (urethane) body 71 is provided with a pair of rearwardly retreating slanted surfaces 71a' on both sides of a forward portion thereof. Thus, both lateral sides that face to the left and right of the headrest members 12 are angled such that the soft foam (urethane) body 71' has a generally wedge shape in a top plan view.

A vehicle headrest apparatus in accordance with the second embodiment improves the effect of protecting the passenger's head H because, by making the front face (which faces the front cover 20') of the soft foam (urethane) body 71' generally wedge-shaped in a top plan view, the external force of the passenger's head can be transmitted quickly to the soft foam (urethane) body 71' with less out-of-plane deformation when the passenger's head H contacts the front cover 20' due to a rear collision.

In the second embodiment, the bending rigidity of the front cover 20' is increased by providing ribs 20c' on the rear side of the front cover 20'.

Third Embodiment

Figure 14:
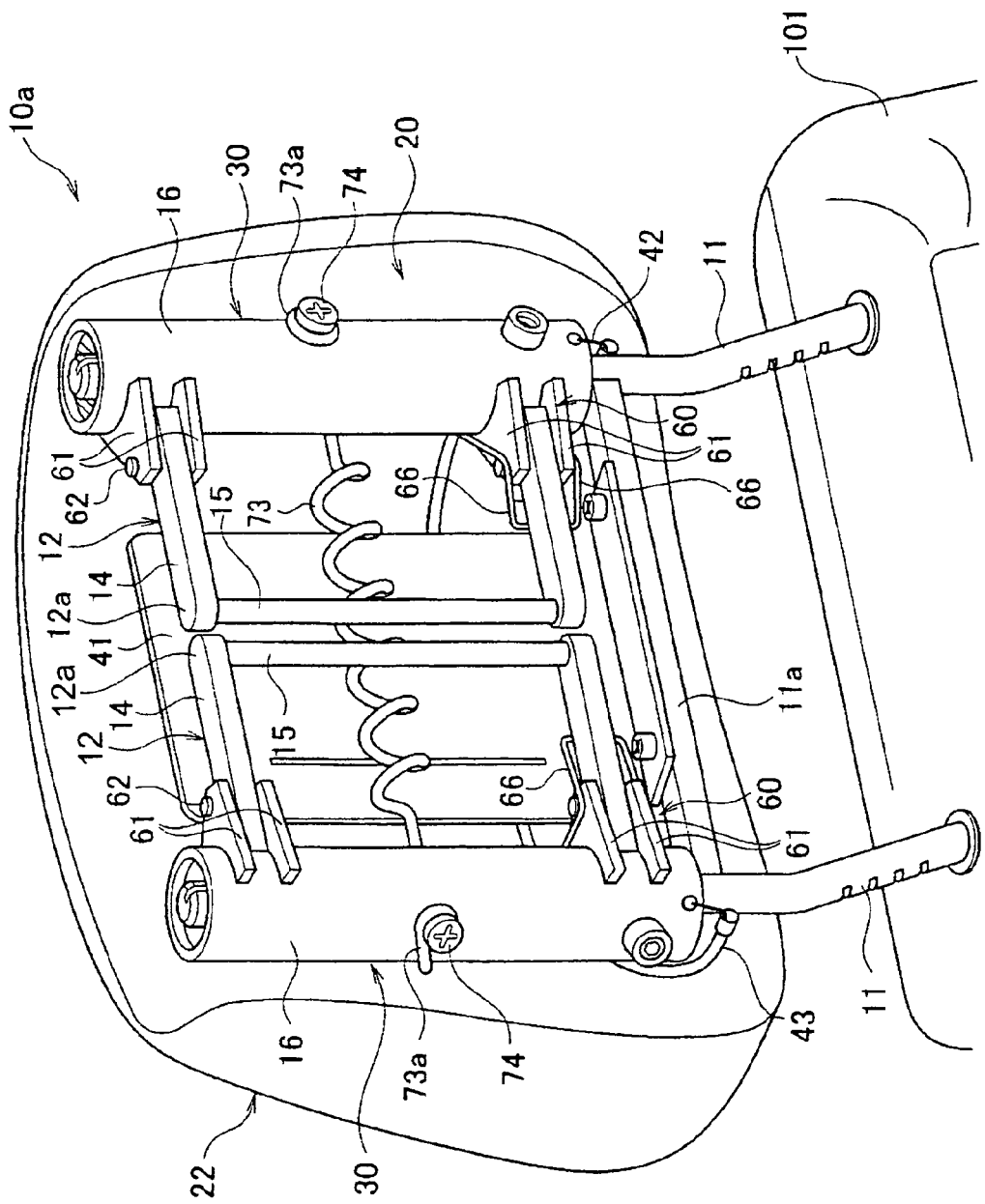
FIG. 14 is a front perspective view of the headrest unit (selected portions being transparent for purposes of illustration) of a third embodiment of the present invention in an initial state prior to deployment.
Figure 15:
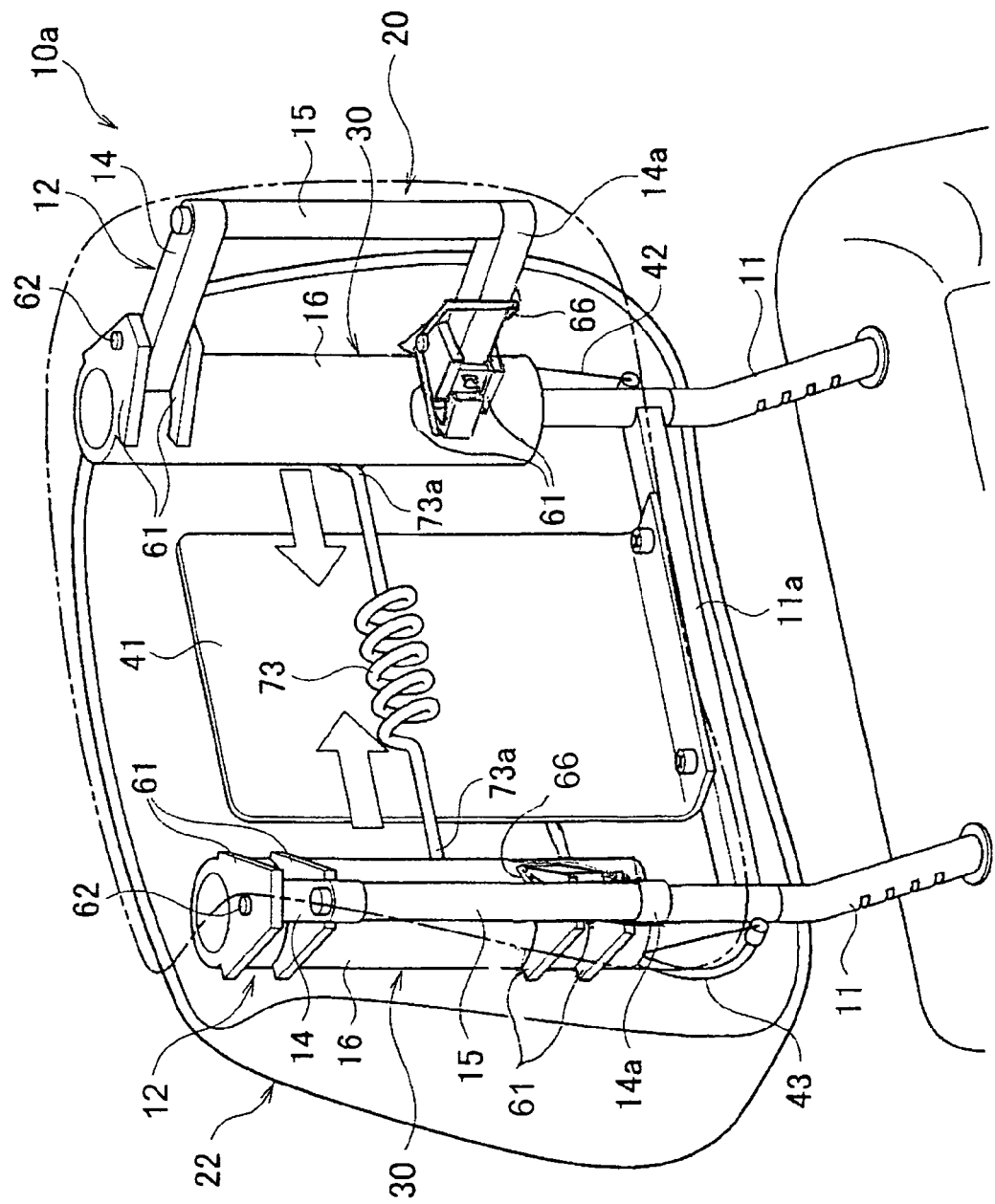
FIG. 15 is a simplified front perspective view of the headrest unit of the third embodiment of the present invention in the completely deployed state with the selected components and parts removed for purposes of illustration.

Referring now to FIGS. 14 and 15, a vehicle headrest apparatus in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 14 is a see-through perspective view of the headrest unit with the left and right headrest members 12 in the initial state. FIG. 15 is a see-through perspective view of the headrest unit with the left and right headrest members in the deployed state. In the third embodiment, as shown in FIG. 14, an elastic member 73 serving as an auxiliary swing force adding device is provided such that it spans across the left and right headrest members 12 between the left and right outer cylinders 16. The elastic member 73 is in a tensile state such that it adds rotational forces against the outer cylinders 16 in the deployment direction of the left and right headrest members 12. In this embodiment, the elastic member 73 is preferably a tensile coil spring.

Hook parts are provided on both ends 73a of the tensile coil spring 73 in this embodiment. The ends of the tensile coil spring 73 are arranged to span across the outer cylinders 16 and to wrap around the outsides of the outer cylinders 16 to a prescribed angle from the rear. The hook parts are secured by screws 74 fastened to the outer cylinders 16.

The rotational angle to which the ends of the tensile coil spring 73 are wrapped around the outer cylinders 16 is set such that the tensile coil spring 73 will remain in tension at least from the initial state of the left and right headrest members 12 to the fully deployed state of the same. As shown in FIG. 15, when the lock device 40 is released, the tensile coil spring 73 adds an auxiliary force to the swing forces of the outer cylinders 16.

Thus, with a vehicle headrest apparatus in accordance with the third embodiment, when the lock device 40 is released due to a rear collision, the tensile coil spring 73 adds an auxiliary tensile spring force to the swing force applied against the left and right headrest members 12 by the swing/pushup force applying devices 30. As a result, similarly to the first embodiment, the passenger's head H can be restrained more quickly and the degree of safety and protection of the passenger's head H can be increased.

Fourth Embodiment

Figure 16:
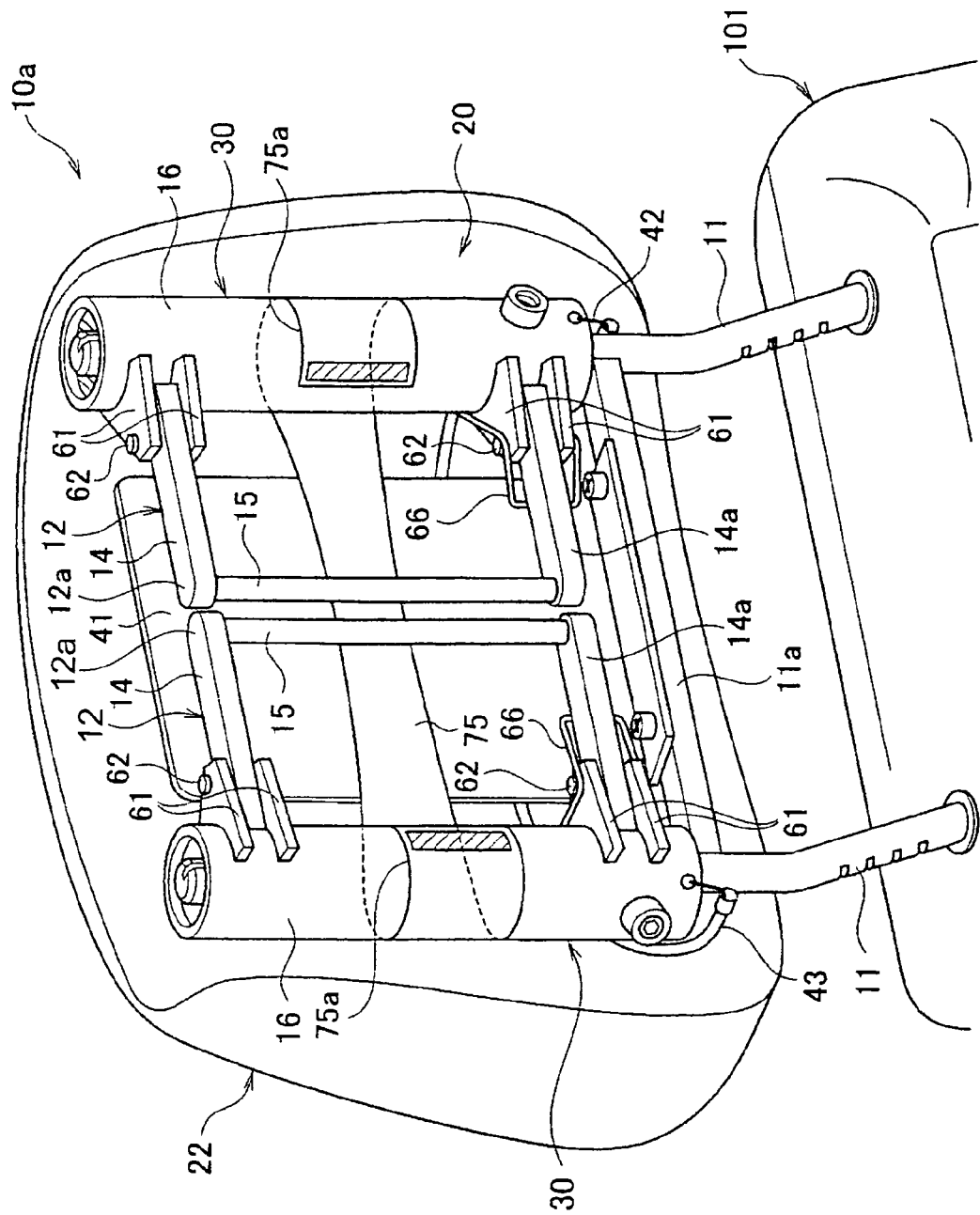
FIG. 16 is a front perspective view of the headrest unit (selected portions being transparent for purposes of illustration) of a fourth embodiment of the present invention in an initial state prior to deployment.
Figure 17:
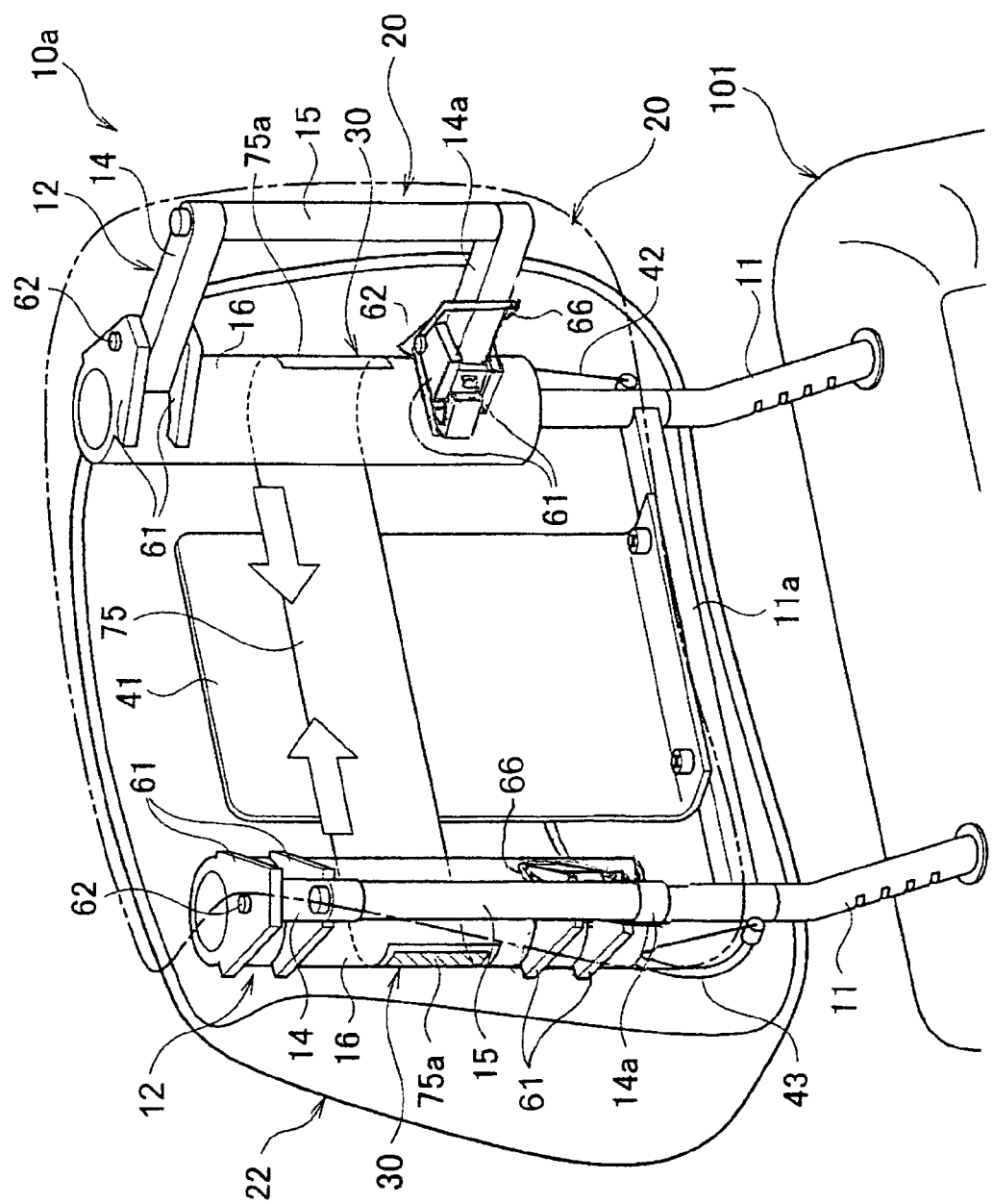
FIG. 17 is a simplified front perspective view of the headrest unit of the fourth embodiment of the present invention in the completely deployed state with the selected components and parts removed for purposes of illustration.

Referring now to FIGS. 16 and 17, a vehicle headrest apparatus in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 16 is a see-through perspective view of the headrest unit with the left and right headrest members 12 in the initial state. FIG. 17 is a see-through perspective view of the headrest unit with the left and right headrest members 12 in the deployed state. In the fourth embodiment, as shown in FIG. 16, a belt-like piece of rubber 75 is used in place of the aforementioned elastic member 74 as an auxiliary swing force adding device.

Similarly to the third embodiment, the belt-like piece of rubber 75 is arranged to span across the left and right outer cylinders 16 and the ends 75a thereof wrap around the outsides of the outer cylinders 16 to a prescribed angle from the rear. The ends are secured to the outer cylinders 16 with an adhesive or other way.

In this embodiment, the rotational angle to which the ends 75a of the belt-like piece of rubber 75 are wrapped around the outer cylinders 16 is set such that the belt-like piece of rubber 75 will remain in tension at least from the initial state of the left and right headrest members 12 to the fully deployed state of the same. As shown in FIG. 17, when the lock device 40 is released, the belt-like piece of rubber 75 adds an auxiliary force to the swing force of the outer cylinders 16.

Thus, with a vehicle headrest apparatus in accordance with the fourth embodiment, when the lock device 40 is released due to a rear collision, the belt-like piece of rubber 75 adds an auxiliary tensile spring force to the swing forces applied against the left and right headrest members 12 by the swing/pushup force applying devices 30. As a result, similarly to the first embodiment, the passenger's head H can be restrained more quickly and the degree of safety and protection of the passenger's head H can be increased.

Although the embodiment describes the piece of rubber 74 as being belt-shaped, the piece of rubber 74 is not limited to a belt-like form. It is also acceptable for the piece of rubber to have a rope-like shape or for a plurality of pieces of rubber to be used.

The vehicle headrest apparatus 10 of the present invention is not limited to the four embodiments described above. Various embodiments can be adopted without deviating from the gist of the present invention. For example, instead of using a piece of urethane 71 as the soft foam body 71 (auxiliary swing force adding device), it is also acceptable to use any other soft foam body having a suitable compressibility and reaction force. Also, instead of using a tensile coil spring 73 or a belt-like piece of rubber 75 as the elastic body (auxiliary swing force adding device), it is acceptable to use any other elastic member having a spring force sufficient to add an auxiliary force when the front cover 20 is deployed.

In the above described embodiments, the term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-103065. The entire disclosure of Japanese Patent Application No. 2003-103065 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle headrest apparatus comprising:
    a headrest unit including left and right headrest members dividing the headrest unit approximately midway in a transverse direction and a mounting member swingably coupling the left and right headrest members to an upper end part of a seatback by the mounting member, the left and right headrest members being adapted to support a seated passenger;
    a head restraining member operatively coupled to the left and right headrest members and movable upward and frontward in a deployment direction;
    a swing/pushup force applying device applying an urging force to the left and right headrest members, the urging force swinging the left and right headrest members upward and frontward in the deployment direction of the head restraining member during deployment of the left and right headrest members;
    an auxiliary force adding device applying an auxiliary urging force to the left and right headrest members in the deployment direction of the head restraining member during deployment of the left and right headrest members;
    a lock device operatively coupled to the left and right headrest members, the lock device holding the left and right headrest members in an initial storage position against the urging force applied by the swing/pushup force applying device and the auxiliary urging force applied by the auxiliary force adding device; and
    a controller operatively coupled to the lock device, the controller releasing the lock device upon detecting a rear-end collision.

2. The vehicle headrest apparatus as recited in claim 1, wherein
    the auxiliary force adding device includes an expandable body installed in a front to rear compressed condition between the left and right headrest members and a holding plate that is fixedly coupled relative to the mounting member such that the holding plate is positioned rearward of the left and right headrest members.

3. The vehicle headrest apparatus as recited in claim 2, wherein
    the expandable body is a soft foam body made of urethane.

4. The vehicle headrest apparatus as recited in claim 3, wherein
    the soft foam body is configured to support the head restraining member from the rear with a large surface that is substantially uniform across a rear section of the head restraining member when the left and right headrest members are in a fully swung forward state.

5. The vehicle headrest apparatus as recited in claim 3, wherein
    the soft foam body includes a forward facing surface and a pair of rearward slanted surfaces extending from lateral sides of the forward facing surface, the lateral sides of the forward facing surface generally facing the left and right headrest members such that the soft foam body has a wedge shape in a top plan view.

6. The vehicle headrest apparatus as recited in claim 2, wherein
    the expandable body is configured to support the head restraining member from the rear with a large surface that is substantially uniform across a rear section of the head restraining member when the left and right headrest members are in a fully swung forward state.

7. The vehicle headrest apparatus as recited in claim 6, wherein
    the expandable body includes a forward facing surface and a pair of rearward slanted surfaces extending from lateral sides of the forward facing surface, the lateral sides of the forward facing surface generally facing the left and right headrest members such that the soft foam body has a wedge shape in a top plan view.

8. The vehicle headrest apparatus as recited in claim 2, wherein
    the expandable body includes a forward facing surface and a pair of rearward slanted surfaces extending from lateral sides of the forward facing surface, the lateral sides of the forward facing surface generally facing the left and right headrest members such that the soft foam body has a wedge shape in a top plan view.

9. The vehicle headrest apparatus as recited in claim 1, wherein the auxiliary force adding device is an elastic member spanning between left and right bodies that are configured to swingably support the left and right headrest members on the mounting member, the elastic member being in a tensile state and configured to add a rotational force against the left and right bodies in the deployment direction of the left and right headrest members.

10. The vehicle headrest apparatus as recited in claim 9, wherein the elastic member is tensile coil spring.

11. The vehicle headrest apparatus as recited in claim 9, wherein the elastic member is an elongated piece of rubber.

12. The vehicle headrest apparatus as recited in claim 9, wherein the head restraining member includes a flexible member coupled to the left and right headrest members such that the flexible member moves upward and toward the front of the vehicle from an non-tensioned state to a tensioned state when the left and right headrest members are in a frilly swung forward state.

13. The vehicle headrest apparatus as recited in claim 1, wherein the head restraining member includes a flexible member coupled to the left and right headrest members such that the flexible member moves upward and toward the front of the vehicle from an non-tensioned state to a tensioned state when the left and right headrest members are in a fully swung forward state.

14. The vehicle headrest apparatus as recited in claim 13, wherein the head restraining member further includes a cover member coupled to the left and right headrest members such that cover member moves upward and toward the front of the vehicle with the flexible member supporting a rear section of the cover when the left and right headrest members are in a fully swung forward state to tension the flexible member.

15. The vehicle headrest apparatus as recited in claim 1, wherein the auxiliary force adding device is configured and arranged to apply the auxiliary urging force to inner free end parts of the left and right headrest members.

16. The vehicle headrest apparatus as recited in claim 15, wherein the head restraining member includes a flexible member coupled to the left and right headrest members such that the flexible member moves upward and toward the front of the vehicle from an non-tensioned state to a tensioned state when the left and right headrest members are in a fully swung forward state.

17. The vehicle headrest apparatus as recited in claim 16, wherein the head restraining member further includes a cover member coupled to the left and right headrest members such that cover member moves upward and toward the front of the vehicle with the flexible member supporting a rear section of the cover when the left and right headrest members are in a fully swung forward state to tension the flexible member.

18. The vehicle headrest apparatus as recited in claim 16, wherein the auxiliary force adding device includes an expandable body installed in a front to rear compressed condition between the left and right headrest members and a holding plate that is fixedly coupled relative to the mounting member such that the holding plate is positioned rearward of the left and right headrest members.

19. The vehicle headrest apparatus as recited in claim 18, wherein the expandable body is configured to support the head restraining member from the rear with a large surface that is substantially uniform across a rear section of the head restraining member when the left and right headrest members are in a fully swung forward state.

20. A vehicle headrest apparatus comprising:

headrest support means for mounting to an upper end part of a seatback and adapted to support a seated passenger's head;

headrest deployment means swingably coupled to the headrest support means between initial storage positions and fully swung forward states;

head restraining means for supporting the passenger's head when a rear end collision occurs, the head restraining means being coupled between the headrest deployment means;

swing/pushup force applying means for applying an urging force to the headrest deployment means, the urging force moves the head restraining means upward and frontward in a deployment direction of the head restraining means during deployment of the headrest deployment means;

auxiliary force adding device means for applying an auxiliary urging force to the headrest deployment means in the deployment direction of the head restraining means during deployment of the headrest deployment means;

lock means for holding the headrest deployment means in the initial storage positions against the urging force applied by the swing/pushup force applying means and the auxiliary urging force applied by the auxiliary force adding means; and control means for releasing the lock device upon detecting a rear-end collision.

* * * * *